(12) United States Patent
Misawa

(10) Patent No.: US 8,493,595 B2
(45) Date of Patent: Jul. 23, 2013

(54) IMAGE PROCESSING APPARATUS, IMAGE PROCESSING METHOD, PROGRAM, AND STORAGE MEDIUM

(75) Inventor: Reiji Misawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 667 days.

(21) Appl. No.: 12/693,280

(22) Filed: Jan. 25, 2010

(65) Prior Publication Data

US 2010/0202015 A1    Aug. 12, 2010

(30) Foreign Application Priority Data

Feb. 6, 2009   (JP) ................................ 2009-026691

(51) Int. Cl.
*G06F 3/12*     (2006.01)
*G06F 17/00*    (2006.01)

(52) U.S. Cl.
USPC ........... 358/1.15; 715/206; 715/243; 715/246

(58) Field of Classification Search
USPC ......... 709/202, 203, 217, 229, 246; 358/1.15, 358/2.1; 715/206, 205, 200
See application file for complete search history.

(56) References Cited

U.S. PATENT DOCUMENTS

| 6,178,434 | B1 | 1/2001 | Saitoh | |
| 6,510,243 | B1 | 1/2003 | Ikeda | |
| 7,747,676 | B1* | 6/2010 | Nayfeh et al. | 709/203 |
| 7,761,781 | B2* | 7/2010 | Cho et al. | 715/206 |
| 7,949,935 | B2* | 5/2011 | Friedman et al. | 715/205 |
| 2011/0276650 | A1* | 11/2011 | Tanaka et al. | 709/217 |

FOREIGN PATENT DOCUMENTS

| JP | 10228473 A | 8/1998 |
| JP | 11306197 A | 11/1999 |
| JP | 2006-350551 A | 12/2006 |

OTHER PUBLICATIONS

Japanese Office Action dated Nov. 30, 2012 in corresponding Japanese Application No. 2009-026691.

* cited by examiner

*Primary Examiner* — Jerome Grant, II
(74) *Attorney, Agent, or Firm* — Fitzpatrick, Cella, Harper & Scinto

(57) ABSTRACT

Each page in document images is divided into regions. Attribute information is assigned to each divided region. Character recognition is performed for a region having a caption attribute, thereby obtaining character information. Metadata of an object is extracted from a region containing an expression synonymous with the character information. Even when the object and metadata exist in different pages, the metadata is associated with the object. The document image is transmitted for each page. Finally, the metadata is transmitted.

11 Claims, 25 Drawing Sheets

FIG. 7

| | ATTRIBUTE | REGION TO WHICH CAPTION BELONGS | X-COORDINATE | Y-COORDINATE | WIDTH W | HEIGHT H | PAGE | CHARACTER INFORMATION |
|---|---|---|---|---|---|---|---|---|
| 601 | TITLE | — | X1 | Y1 | W1 | H1 | 1 | SAMPLE |
| 602 | TABLE | — | X2 | Y2 | W2 | H2 | 1 | — |
| 603 | PHOTO | — | X3 | Y3 | W3 | H3 | 1 | — |
| 604 | CAPTION | 603 | X4 | Y4 | W4 | H4 | 1 | FIG. 1 |
| 605 | BODY | — | X5 | Y5 | W5 | H5 | 1 | …FIG. 1 IS AAA. … |

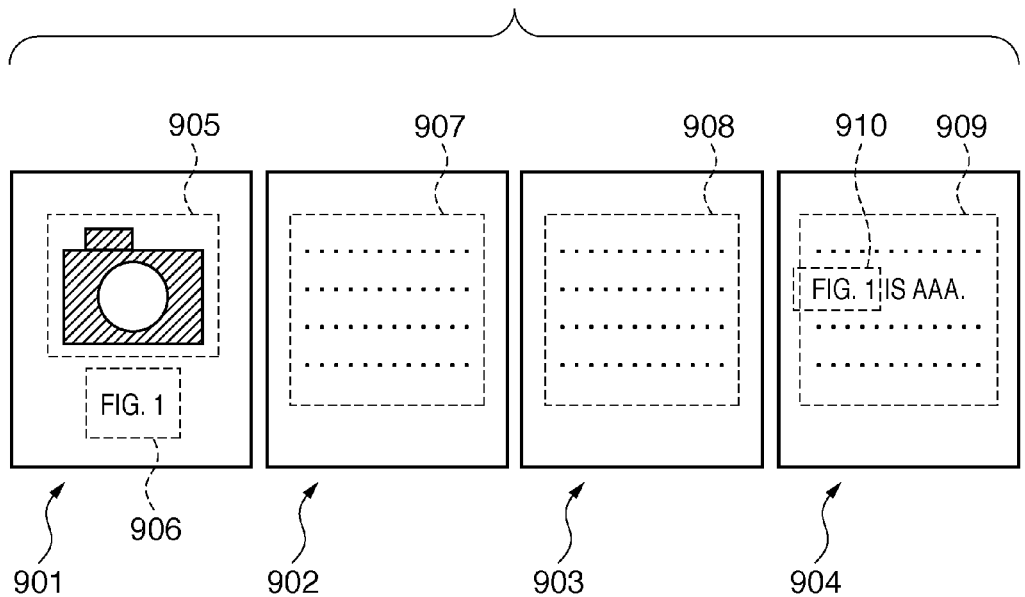
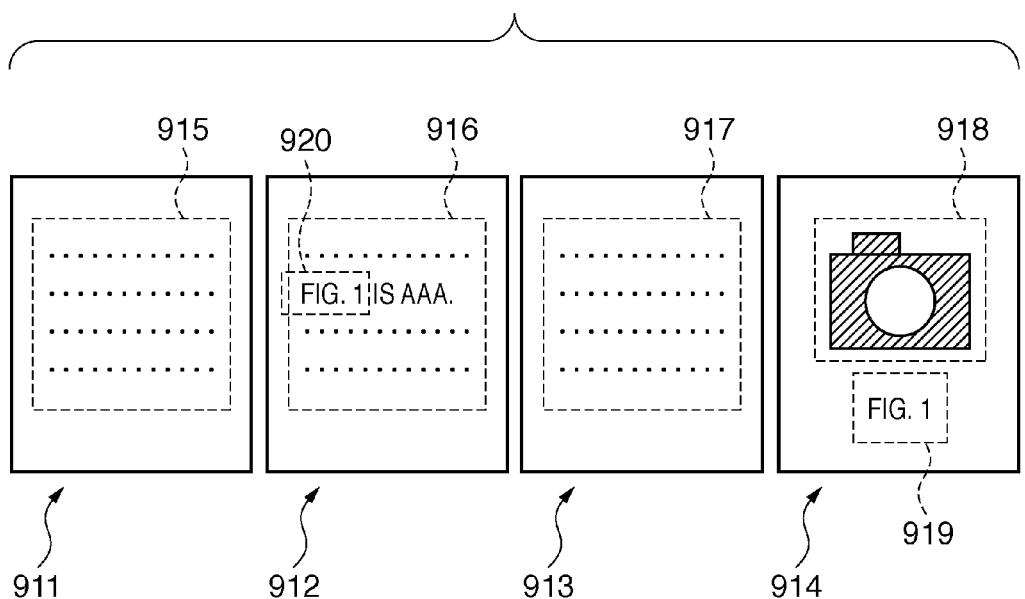

FIG. 10

|     | ATTRIBUTE | REGION TO WHICH CAPTION BELONGS | X-COORDINATE | Y-COORDINATE | WIDTH W | HEIGHT H | PAGE | CHARACTER INFORMATION |
|-----|-----------|-------------------------------|--------------|--------------|---------|----------|------|----------------------|
| 905 | PHOTO     | —                             | X1           | Y1           | W1      | H1       | 1    | —                    |
| 906 | CAPTION   | 905                           | X2           | Y2           | W2      | H2       | 1    | FIG. 1               |

FIG. 11A

| | ATTRIBUTE | REGION TO WHICH CAPTION BELONGS | X-COORDINATE | Y-COORDINATE | WIDTH W | HEIGHT H | PAGE | CHARACTER INFORMATION |
|---|---|---|---|---|---|---|---|---|
| 905 | PHOTO | — | X1 | Y1 | W1 | H1 | 1 | — |
| 906 | CAPTION | 905 | X2 | Y2 | W2 | H2 | 1 | FIG. 1 |
| 907 | BODY | — | X3 | Y3 | W3 | H3 | 2 | ... |
| 908 | BODY | — | X4 | Y4 | W4 | H4 | 3 | ... |
| 909 | BODY | — | X5 | Y5 | W5 | H5 | 4 | ...FIG. 1 IS AAA. ... |

F I G. 11B

| | ATTRIBUTE | REGION TO WHICH CAPTION BELONGS | X-COORDINATE | Y-COORDINATE | WIDTH W | HEIGHT H | PAGE | CHARACTER INFORMATION |
|---|---|---|---|---|---|---|---|---|
| 915 | BODY | — | X6 | Y6 | W6 | H6 | 1 | ······ |
| 916 | BODY | — | X7 | Y7 | W7 | H7 | 2 | ··· FIG. 1 IS AAA. ··· |
| 917 | BODY | — | X8 | Y8 | W8 | H8 | 3 | ······ |
| 918 | PHOTO | — | X9 | Y9 | W9 | H9 | 4 | — |
| 919 | CAPTION | 918 | X10 | Y10 | W10 | H10 | 4 | FIG. 1 |

FIG. 11C

| | ATTRIBUTE | REGION TO WHICH CAPTION BELONGS | X-COORDINATE | Y-COORDINATE | WIDTH W | HEIGHT H | PAGE | CHARACTER INFORMATION |
|---|---|---|---|---|---|---|---|---|
| 934 | BODY | — | X11 | Y11 | W11 | H11 | 1 | — |
| 935 | BODY | — | X12 | Y12 | H12 | H12 | 2 | …FIG. 1 IS AAA.… |
| 936 | BODY | — | X13 | Y13 | W13 | H13 | 2 | — |
| 937 | BODY | — | X14 | Y14 | W14 | H14 | 3 | — |
| 938 | PHOTO | — | X15 | Y15 | W15 | H15 | 4 | — |
| 939 | CAPTION | 938 | X16 | Y16 | W16 | H16 | 4 | FIG. 1 |

```
q
.1 0 0 .1 0 0 cm
q
1228.80 0 0 108000 234240 464640 cm
/Shape<</MCID 0>>BDC          ~1311
/Obj5 Do                      ~1312
EMC
Q
Q
```

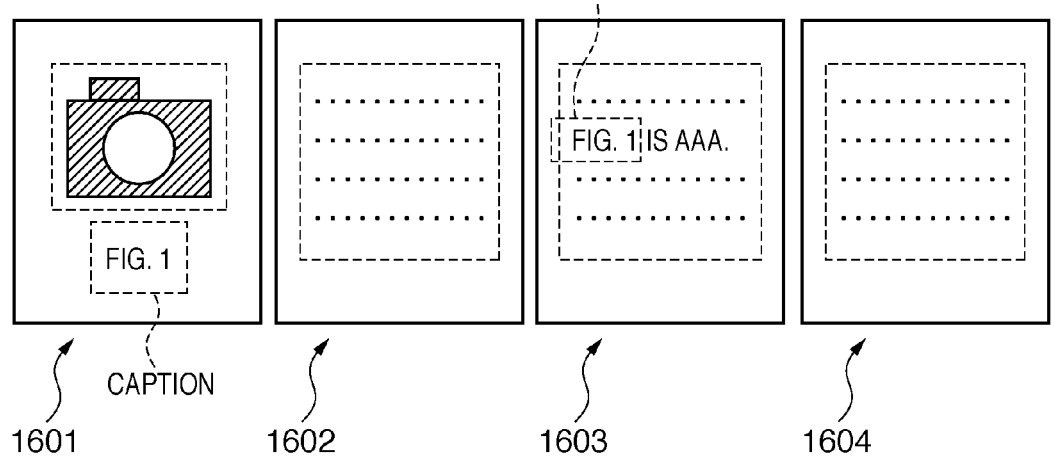
F I G. 16

F I G. 20
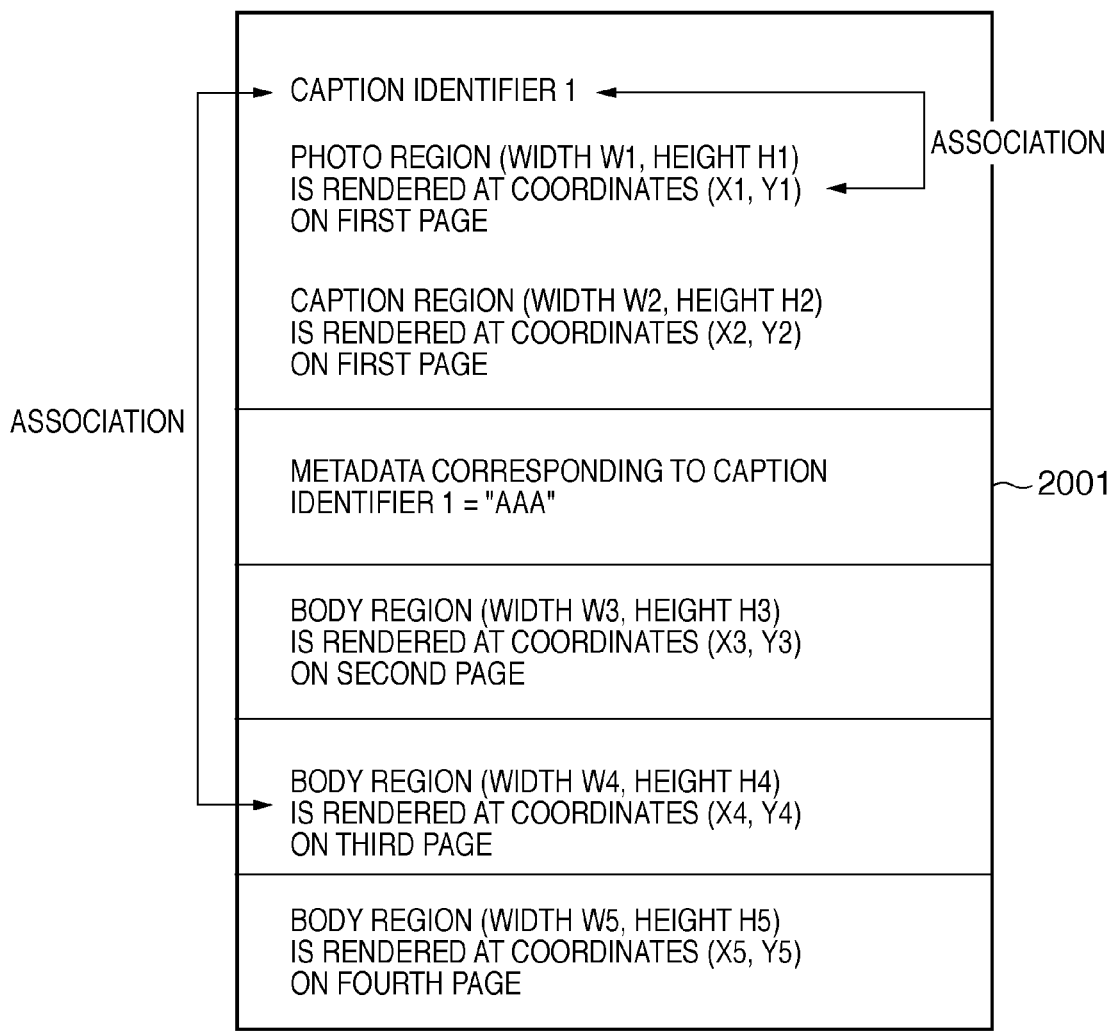

IMAGE PROCESSING APPARATUS, IMAGE PROCESSING METHOD, PROGRAM, AND STORAGE MEDIUM

BACKGROUND OF THE INVENTION

1. Field of the Invention

The present invention relates to an image processing apparatus, image processing method, program, and storage medium for generating metadata for searching for an object in document images formed from a plurality of pages and transmitting the metadata to an external apparatus.

2. Description of the Related Art

Conventionally, when a character string adjacent to a non-text object (e.g., a photo, drawing, line art, or table) in a document image is a caption describing the object, the character string of the caption is associated as metadata with the object. In the following description, an object refers to a photo, drawing, line art, table, or the like and excludes text, unless otherwise specified. Metadata associated with an object can function as a search keyword to search for the object when an application uses a document image (see, for example, Japanese Patent Laid-Open No. 11-306197).

In a general document image, a figure number (e.g., "FIG. 1" or "FIG. 1") is often described in a caption region adjacent to an object such as a drawing. The object is explained in the body using the figure number. In such a case, a hypertext is formed by automatically generating a link between a figure number and the same expression in a body. Assume that a caption adjacent to an object is "FIG. 1" and a description "FIG. 1 is AAA." exists in a body. Since the caption "FIG. 1" and "FIG. 1" in the body are the same expression, a link is generated (see, for example, Japanese Patent Laid-Open No. 10-228473).

A system is becoming popular, in which a scanner or MFP (Multi Function Peripheral) is connected to a host computer (to be referred to as a PC) via a network or the like. A document image input by the scanner or MFP can be transmitted to the PC via the network. In this system, a document image to be transmitted to the PC generally undergoes arbitrary image processing and format conversion processing (e.g., PDF, XPS, or JPEG).

When transmitting a document image to the PC in the system, multi-page data (e.g., multi-page PDF) can also be generated from input document images of a plurality of pages.

Problems will be explained, which arise from association of metadata with an object in order to search for the object when transmitting input document images of a plurality of pages from the MFP or the like to the PC. Especially a case in which the page of a caption adjacent to an object is different from that of a body containing the same expression as a character string (e.g., figure number) in the caption will be described with reference to FIG. 8A.

FIG. 8A exemplifies document images formed from four pages. Reference numerals 801 to 804 denote first to fourth pages in order. The page 801 includes a photo object and a caption "FIG. 1" adjacent to the object. The pages 802 and 803 include only bodies. The page 804 includes only a body, too, but contains the same expression as the caption "FIG. 1" in the page 801.

According to the conventional technique, for example, a character string "AAA" is extracted as metadata for searching for the photo object in the page 801, from the body of the page 804 containing the same expression as the caption "FIG. 1" in the page 801. More specifically, the character string "AAA" in the body of the page 804 is associated as metadata with the photo object in the page 801. An application can search for the photo object in the page 801 by using "AAA" as a search keyword.

However, the following problem occurs when the MFP associates the character string "AAA" in the body of the page 804 with the photo object in the page 801 shown in FIG. 8A and transmits the document images to the PC. More specifically, the MFP cannot transmit the page 801 till the completion of detecting the page 804 of the body containing the same expression as the caption and associating metadata. The MFP needs to hold the page 801. If the pages 802 and 803 are transmitted to the PC before the page 801, the page order changes. Hence, the MFP cannot transmit the pages 802 and 803 and needs to hold them, too. The MFP therefore requires a large work memory to hold pages. For example, even if one page is 500 KB (kilobytes) in document images made up of four pages as shown in FIG. 8A, a 2-MG (megabytes) work memory is necessary.

Another problem is poor transfer efficiency because transmission cannot start until the page 804 of the body containing the same expression as the caption is detected.

SUMMARY OF THE INVENTION

The present invention has been made to overcome the conventional drawbacks, and provides an image processing apparatus and image processing method for implementing the following function when generating and transmitting metadata for searching for an object in document images formed from a plurality of pages. That is, even when a page containing a caption adjacent to an object is different from one containing an expression synonymous with the caption, transmission can start before detecting the page containing the synonymous expression.

According to one aspect of the present invention, there is provided an image processing apparatus which generates metadata for searching for an object in document images formed from a plurality of pages and transmits the metadata to an external apparatus, comprising:

a region division unit configured to divide each page in the document images into regions in accordance with attributes;

a character recognition unit configured to perform character recognition for a region having a caption attribute adjacent to an object divided by the region division unit, thereby obtaining character information;

a metadata extraction unit configured to detect a region containing an expression synonymous with the character information from the region divided by the region division unit, and extract metadata of the object from the detected region;

an assignment unit configured to assign, to the object, an identifier for identifying a caption, and assign the identifier to the metadata;

a document image transmission unit configured to transmit information of the object having the identifier in a predetermined unit; and a metadata transmission unit configured to transmit the metadata having the identifier.

According to another aspect of the present invention, there is provided an image processing method of generating metadata for searching for an object in document images formed from a plurality of pages and transmitting the metadata to an external apparatus, the method comprising steps of:

dividing each page in the document images into regions in accordance with attributes;

performing character recognition for a region having a caption attribute adjacent to an object divided in the dividing step, thereby obtaining character information;

detecting a region containing an expression synonymous with the character information from the region divided in the dividing step to extract metadata of the object from the detected region;

assigning, to the object, an identifier for identifying a caption, and the identifier to the metadata;

transmitting information of the object having the identifier in a predetermined unit; and transmitting the metadata having the identifier.

With this arrangement, the present invention can implement the following function when generating and transmitting metadata for searching for an object in document images formed from a plurality of pages. That is, even when a page containing a caption adjacent to an object is different from one containing metadata serving as an expression synonymous with the caption, transmission can start before detecting the page containing the metadata.

Further features of the present invention will become apparent from the following description of exemplary embodiments (with reference to the attached drawings).

BRIEF DESCRIPTION OF THE DRAWINGS

FIG. 7 is a table exemplifying region information in the first embodiment;

FIG. 9A is a view exemplifying image data of a plurality of pages to be processed in the first embodiment;

FIG. 9B is a view exemplifying image data of a plurality of pages to be processed in the third embodiment;

FIG. 10 is a table exemplifying region information of the first page in the first embodiment;

FIG. 11A is a table exemplifying region information of the first to fourth pages in the first embodiment;

FIG. 11B is a table exemplifying region information of the first to fourth pages in the third embodiment;

FIG. 11C is a table exemplifying region information of the first to fourth pages in the fourth embodiment;

FIG. 16 is a view showing an example in which the same expression as a caption exists in the body region of an intermediate page;

FIG. 20 is a view showing the outline of PDF data of the first to fourth pages in the second embodiment;

DESCRIPTION OF THE EMBODIMENTS

Embodiments of the present invention will be described in detail below with reference to the accompanying drawings. Configurations set forth in these embodiments are merely examples, and the present invention is not limited to illustrative configurations.

First Embodiment

The first embodiment will explain a method of associating metadata serving as an object search character string with an object and generating a multi-page PDF while saving the memory without decreasing the transfer efficiency. As described above, an object in the embodiment refers to a photo, drawing, line art, table, or the like and excludes text, unless otherwise specified.

System Configuration

Figure 1:
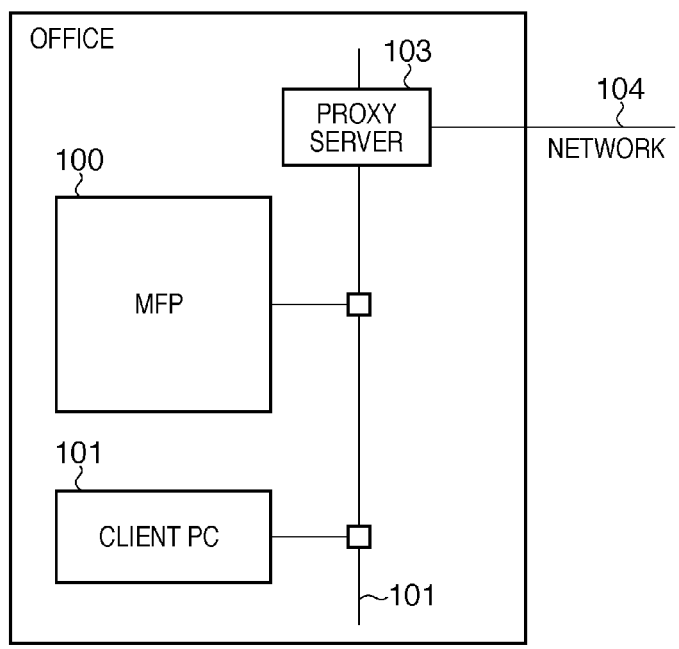
FIG. 1 is a block diagram showing the configuration of an image processing system in the first embodiment according to the present invention.

FIG. 1 is a block diagram showing the configuration of an image processing system in the first embodiment. In FIG. 1, a LAN 102 built in an office is connected to an MFP (Multi Function Peripheral) 100 which implements a plurality of kinds of functions (e.g., copy function, print function, and transmission function). The LAN 102 is further connected to a client PC 101 which receives data transmitted from the MFP 100 and uses functions provided by the MFP 100, and a proxy server 103. For example, the client PC 101 can transmit print data to the MFP 100 to generate a printed product based on the print data by the MFP 100. The LAN 102 is connected to a network 104 capable of communicating with the outside of the office via the proxy server 103.

The configuration shown in FIG. 1 is merely an example, and a plurality of offices having the same building components as those in the office shown in FIG. 1 may be connected to the network 104. The network 104 is a so-called communication network and suffices to be able to transmit/receive data. More specifically, the network 104 is provided as one or a combination of the Internet, LAN, WAN, telephone line, dedicated digital line, ATM, frame relay line, communication satellite channel, cable television line, data broadcasting wireless channel, and the like. Various terminals such as the client PC 101 and proxy server 103 have standard building components mounted in a general-purpose computer. The building components are, for example, a CPU, RAM, ROM, hard disk, external storage device, network interface, display, keyboard, and mouse.

MFP Configuration

The detailed configuration of the MFP 100 will be explained with reference to FIG. 2.

[Overall Configuration]

Figure 2:
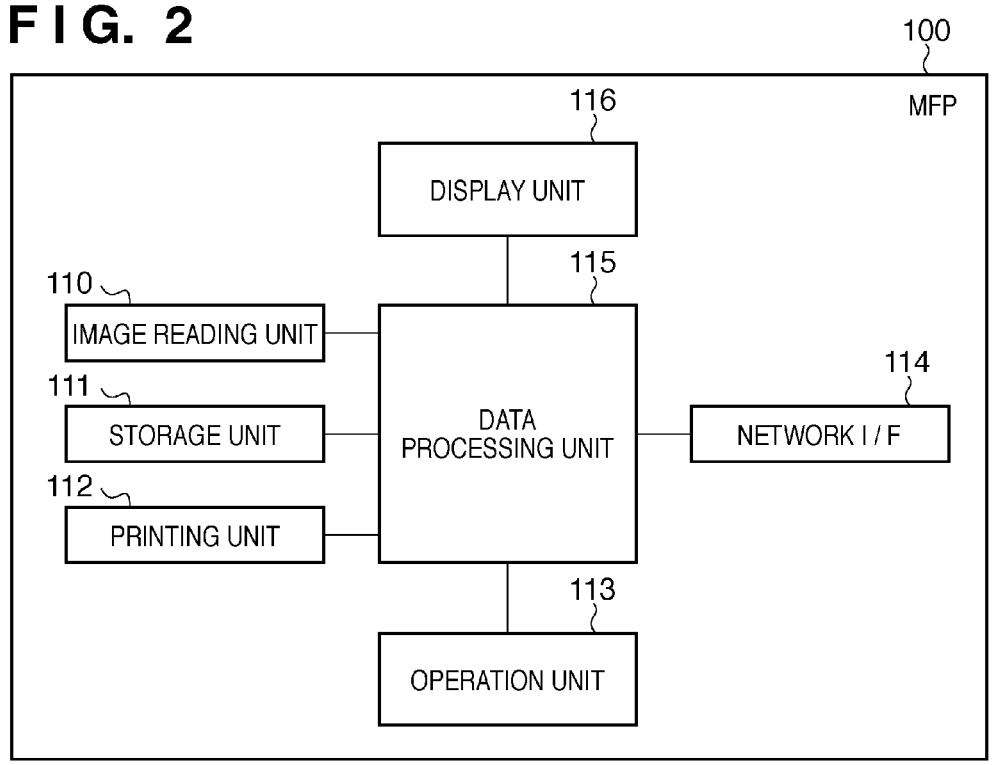
FIG. 2 is a block diagram showing the configuration of an MFP in the first embodiment.

In FIG. 2, an image reading unit 110 includes an auto document feeder (ADF). In the image reading unit (scanner) 110, a light source (not shown) irradiates a document, forming a document reflecting image on a solid-state image sensing element. Raster image reading signals are obtained from the solid-state image sensing element as image data at a predetermined density (e.g., 600 DPI).

The MFP 100 also has a copy function of printing an image corresponding to an image reading signal on a print medium by a printing unit 112. When copying one document image, a data processing unit 115 performs image processing for an image reading signal obtained from the image reading unit 110, thereby generating a print signal. The printing unit 112 prints on a print medium based on the print signal. When copying a plurality of document images, print signals of one page are temporarily stored and held in a storage unit 111 and then output to the printing unit 112. This processing is sequentially repeated to print a plurality of document images on print media.

The MFP 100 has a transmission function of transmitting an image file via a network I/F 114. In transmission, the data processing unit 115 converts an image signal obtained from the image reading unit 110 into an image file in a compressed image file format such as TIFF or JPEG or a vector data file format such as PDF. The image file is then output from the network I/F 114. The output image file is transmitted to the client PC 101 via the LAN 102 or further transferred to an external terminal (e.g., another MFP or client PC) via the network 104.

The MFP 100 has a print function implemented by the printing unit 112. In printing, the data processing unit 115 executes image processing. For example, the data processing unit 115 receives, via the network I/F 114, print data output from the client PC 101. The data processing unit 115 converts the print data into raster data printable by the printing unit 112. The printing unit 112 forms an image on a print medium.

A user instruction to the MFP 100 is input from an operation unit 113 including a key operation unit and touch panel, and a display unit 116, which are attached to the MFP 100. A control unit (not shown) in the data processing unit 115 controls the series of operations. The display unit 116 displays an operation input state and image data during processing.

The storage unit 111 includes a work memory (RAM) used when the data processing unit 115 processes image data read by the image reading unit 110. The storage unit 111 may include a large-capacity hard disk and form a database for storing and managing image data transmitted from the client PC 101.

The embodiment will be explained using the MFP 100. However, the present invention is not limited to the MFP and may be implemented by a scanner apparatus.

Figure 3:
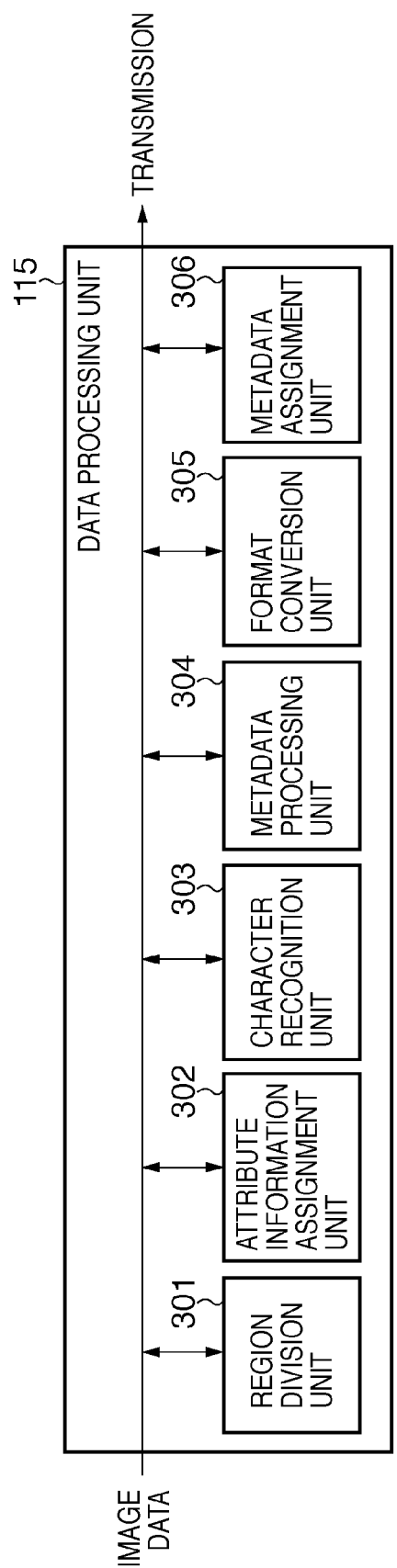
FIG. 3 is a block diagram showing the detailed configuration of a data processing unit in the MFP in the first embodiment.

Details of the data processing unit 115 shown in FIG. 2 will be explained with reference to FIG. 3. As shown in FIG. 3, the data processing unit 115 includes a region division unit 301, attribute information assignment unit 302, character recognition unit 303, metadata processing unit 304, format conversion unit 305, and metadata assignment unit 306.

These units will be described below.

[Region Division Unit]

Figure 6:
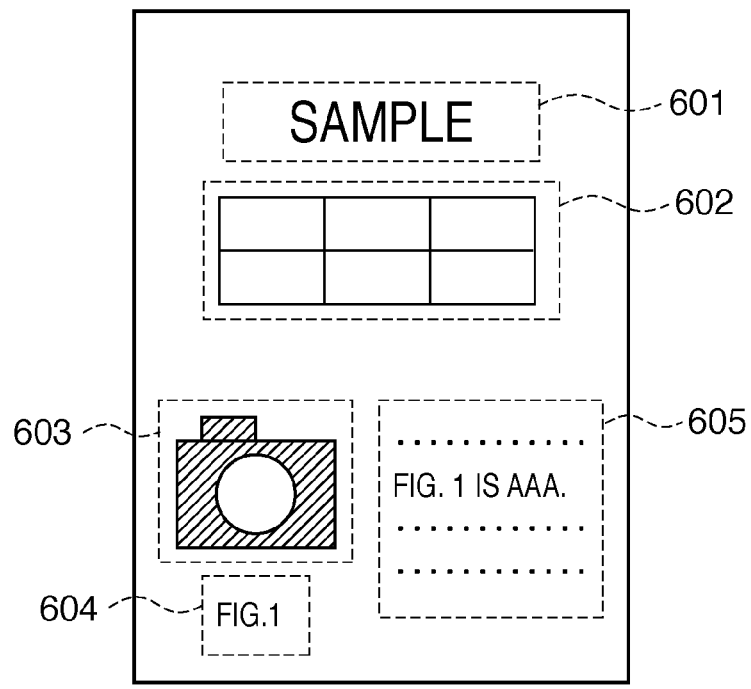
FIG. 6 is a view exemplifying region division in the first embodiment.

The region division unit 301 receives image data obtained from the image reading unit 110 shown in FIG. 1 or image data saved in the storage unit 111, and extracts a region. An example of the region extraction method will be explained. First, a thinned image is created by decreasing the resolution of a binary input image. At this time, the input image is divided into every M×N pixels. If a significant image (black pixel) exists at even one pixel in each divided region, a thinned image (i.e., low-resolution image) is created using the divided region as one black pixel. In this case, the image is thinned to a degree at which one character is connected as one black pixel-concatenated element. If an image is thinned to a degree at which character spacings on one character line are narrowed, the character line can be easily extracted. Then, black pixel-concatenated portions in the thinned image are combined to create a small rectangle. At this time, if the rectangle size is close to the size of a character (predetermined character size) assumed to be contained in the document image, it is determined that the rectangle is a character rectangle. When character rectangles of almost the same size are aligned, it is determined that these rectangles form a character line. These rectangles are concatenated to form a character line rectangle. Further, when the short sides of rectangles determined to be a character line are close to each other, the rectangles are highly likely to belong to the same character line and thus are concatenated. When a set of rectangles which are determined to be a character line, have almost the same length on the short side, and are aligned at almost the same interval in the column direction are highly likely to form one body. These rectangles are then concatenated. As a result, a text region such as a body, a drawing region, and the like are extracted. After that, position information of a region extracted based on the low-resolution image is acquired, and a region at a corresponding position in the input image (high-resolution image) is extracted. For example, rectangular regions 601 to 605 as shown in FIG. 6 are extracted.

[Attribute Information Assignment Unit]

The attribute information assignment unit 302 adds an attribute to each region divided by the region division unit 301. An example will be explained with reference to FIG. 6. The region 605 is created by concatenating regions determined to be character lines. It is therefore determined that the region 605 is highly likely to be a body. An attribute "body" is added to the region 605.

As for the remaining regions, the attribute information assignment unit 302 first determines whether each region contains a text. In the example of FIG. 6, the regions 601 and 604 are determined to be regions (text regions) containing texts. Generally in a text-containing region, images periodically appear and disappear. Based on the image periodicity, it may be determined whether a region contains a text.

As for regions other than the text region, the attribute information assignment unit 302 assigns an attribute "noise" to a region having a small size. The attribute information assignment unit 302 assigns an attribute "table" to a region having a low pixel density. The attribute information assignment unit 302 determines that other regions are a picture or photo, and assigns an attribute "photo". In the embodiment, a drawing, line art, and the like are also handled as objects, in addition to the "table" and "photo", so attributes such as "drawing" and "line art" may be added. At this time, the type of object corresponding to each region needs to be determined. However, this method is well known and a detailed description thereof will be omitted.

When a text region exists close to the upper or lower portion of an object having the attribute "table" or "photo" and has a character size equal to or slightly smaller than that of a body, the text region is determined to represent the caption of the object, and an attribute "caption" is added. As will be described later, a character string serving as metadata is extracted from a body region (and caption region) based on a character string in a text region having the attribute "caption". The metadata is associated with an adjacent object. This facilitates search for an object such as a photo in search processing. For a region having the attribute "caption", information on an object region to which the caption belongs is added so that the object region to which the caption belongs can be specified.

For a text region other than a body and caption, the attribute information assignment unit 302 adds an attribute "title" if the line width of a character line is larger than that of a character line in a body and the text region is positioned on a stage different from that of the body. The attribute information assignment unit 302 adds an attribute "subtitle" if the line width of a character line is larger than that of a character line in a body but the width of a region is almost equal to the width of the body. The attribute information assignment unit 302 adds an attribute "page" (page footer/page header) if the line width of a character line is equal to or smaller than that of a character line in a body and the region exists at the lower or upper end of a document. The attribute information assignment unit 302 adds an attribute "text" to a region which is determined to be a text region but corresponds to none of "body", "title", "subtitle", "caption", and "page".

As described above, the attribute information assignment unit 302 adds the attribute "title" to the region 601 shown in FIG. 6, "table" to the region 602, "photo" to the region 603, "caption" to the region 604, and "body" to the region 605.

[Character Recognition Unit]

The character recognition unit 303 executes character recognition for regions having the attributes "text", "body", "title", "subtitle", and "caption". The character recognition unit 303 associates the results as character information with the target regions.

The storage unit 111 saves information on the position, size, and the like of a region, page information, the attribute of the region, and character information of the region, which are extracted by the region division unit 301, attribute information assignment unit 302, and character recognition unit 303. FIG. 7 shows information saved in the storage unit 111 for the image data shown in FIG. 6.

[Metadata Processing Unit]

The metadata processing unit 304 determines whether image data contains a caption region (region having the caption attribute). If image data contains a caption region, the metadata processing unit 304 assigns a caption identifier to a region (object region of a drawing or the like adjacent to the caption) to which the caption belongs. Metadata for searching for a region to which a caption belongs is unknown until the page of a body containing the same expression as the caption is detected. For this reason, the caption identifier assigned here is an index indicating that any metadata will be assigned later.

The metadata processing unit 304 then determines whether a body region (region having the body attribute) contains the same expression as character information of the caption region. If a body region contains the same expression as character information of the caption region, the metadata processing unit 304 extracts metadata from the body region in order to search for a region to which the caption belongs. The metadata processing unit 304 holds the metadata in association with a caption identifier. For example, when a word obtained from a character string in a caption region is "FIG. 1", a sentence containing "FIG. 1" is extracted from the body and associated with a caption identifier so that it is usable as metadata.

[Format Conversion Unit]

The format conversion unit 305 converts the format of image data obtained from the image reading unit 110. The format conversion is executed based on pieces of information (e.g., information on the position, size, and the like of a region, page information, the attribute of the region, character information of the region, and metadata) obtained from the region division unit 301, attribute information assignment unit 302, character recognition unit 303, and metadata processing unit 304. The format after conversion needs to be a format (e.g., PDF, XPS, or OOXML) capable of associating metadata with an object. When image data are formed from a plurality of pages, they are converted into a format (e.g., multi-page PDF) capable of holding multiple pages.

[Metadata Assignment Unit]

The metadata assignment unit 306 assigns, to data whose format has been converted by the format conversion unit 305, metadata which is held in the metadata processing unit 304 and associated with a caption identifier.

Image Processing

The outline of whole image processing in the image processing system according to the embodiment will be explained with reference to the flowcharts of FIGS. 4 and 5.

Figure 4:
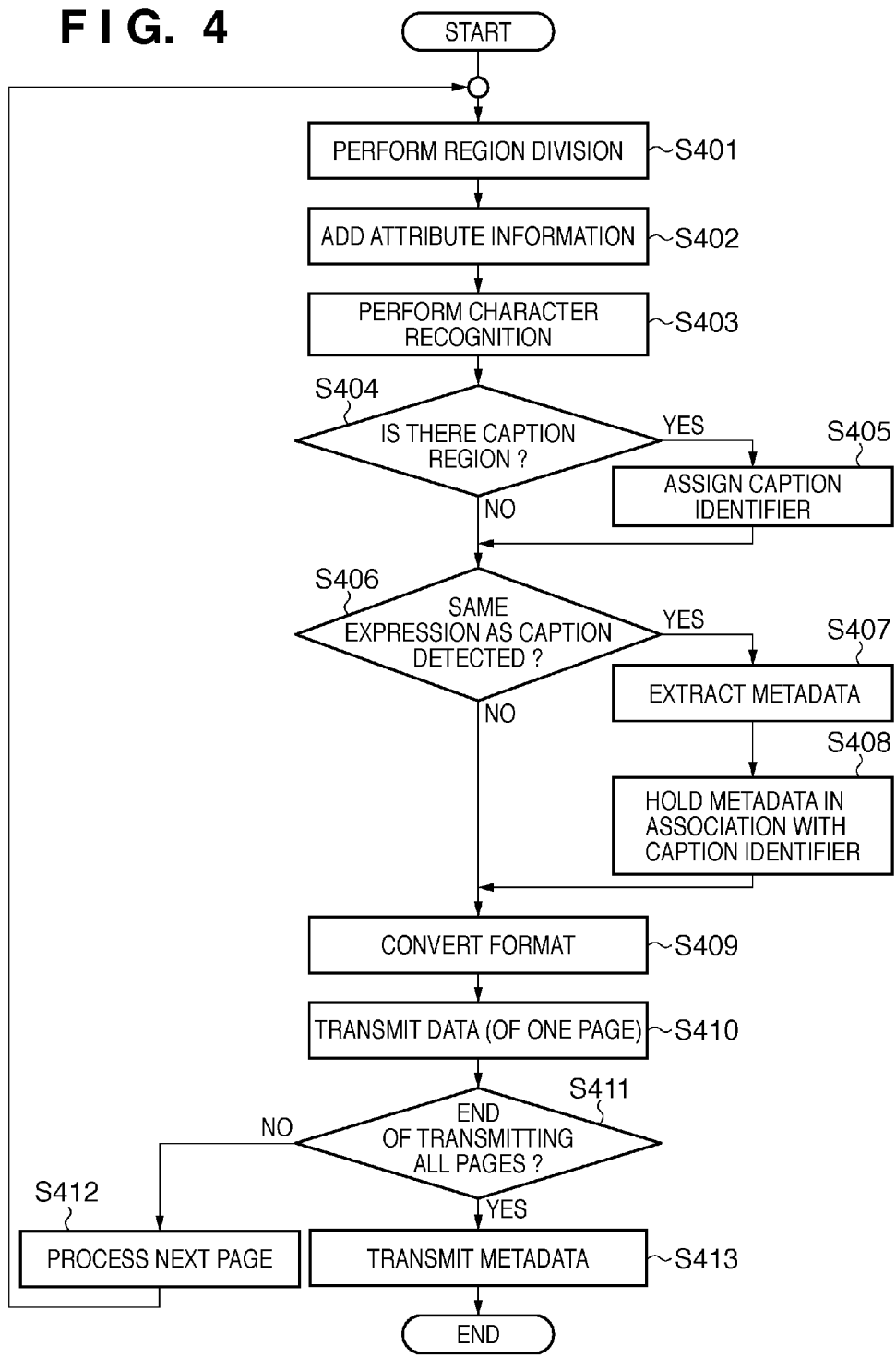
FIG. 4 is a flowchart showing processing on the transmitting side in the first embodiment.
Figure 5:
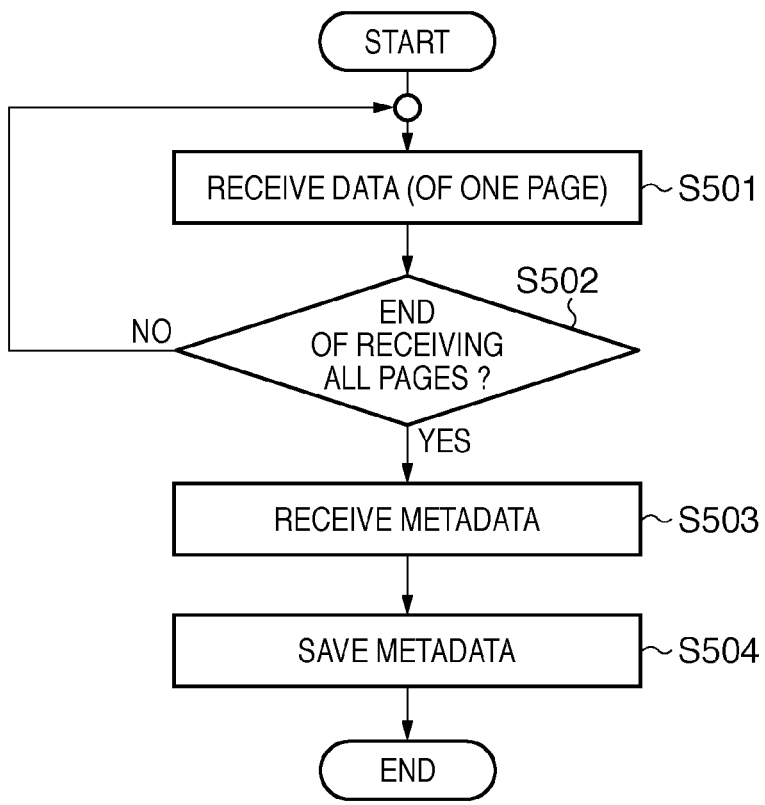
FIG. 5 is a flowchart showing processing on the receiving side in the first embodiment.

FIGS. 4 and 5 are flowcharts showing processes on the transmitting and receiving sides when the MFP 100 converts input image data of a plurality of pages into a multi-page PDF and transmits the multi-page PDF to the client PC 101. Image data 901 to 904 of a plurality of pages shown in FIG. 9A are assumed to be input. FIG. 9A exemplifies document images formed from four pages, similar to FIG. 8A. The image data 901 to 904 are the first to fourth pages in order.

[Processing on Transmitting Side]

Processing on the transmitting side shown in the flowchart of FIG. 4 will be explained. This processing is done in order of the first to fourth pages.

Processing of First Page

In step S401, the region division unit 301 extracts regions 905 and 906 from the input image data 901 (first page).

In step S402, the attribute information assignment unit 302 adds attributes to the respective regions 905 and 906 extracted in step S401. In the example of FIG. 9A, the attribute information assignment unit 302 assigns the attribute "photo" to the region 905 and the attribute "caption" to the region 906. The photo region 905 is recorded as an object to which the caption belongs.

In step S403, the character recognition unit 303 executes character recognition for the region 906 to which the attribute "caption" has been added in step S402. The character recognition unit 303 associates the result as character information with the target region. The character recognition unit 303 obtains character information "FIG. 1" from the region 906 and associates it with the region 906.

The storage unit 111 saves information on the position, size, and the like of a region, page information, the attribute of the region, and character information of the region, which have been extracted in the processes of steps S401 to S403.

FIG. 10 shows information saved in the storage unit 111 for the image data 901 (first page).

In step S404, the metadata processing unit 304 determines whether the image data 901 contains a caption region (region added with the caption attribute). If the image data 901 contains a caption region, the process advances to step S405; if it does not contain a caption region, to step S406. Since the image data 901 contains the caption region 906, the process advances to step S405.

In step S405, the metadata processing unit 304 assigns a caption identifier to the photo region 905 to which the caption region 906 belongs. As described above, metadata for searching for a region to which a caption belongs is unknown until the page of a body containing the same expression as the caption is detected. More specifically, metadata for searching for the photo region 905 to which the caption region 906 of the image data 901 (first page) belongs is detected in a body region 909 of the image data 904 (fourth page) (to be described later). Thus, information on the image data 901 is transmitted before processing the image data 904. Accordingly, the first embodiment increases the transfer efficiency and reduces the work memory for holding pages. When information on the first page is transmitted, metadata of the photo region 905 is unknown. When the same expression is detected in the fourth page to determine metadata, the region (photo region 905) to which the caption to be associated belongs has already been transmitted and does not exist in the work memory. In step S405, therefore, a caption identifier is assigned to represent that any metadata is to be associated later. "Caption identifier 1" is assumed to be used as the caption identifier. When a plurality of caption identifiers are necessary, they are numbered like "caption identifier 2" and "caption identifier 3". For example, different caption identifiers are assigned to respective character strings extracted from caption regions.

In step S406, the metadata processing unit 304 determines whether the body region (region having the body attribute) contains the same expression as character information of the caption region. If the body region contains the same expression, the process advances to step S407; if it does not contain the same expression, to step S409. Since the image data 901 does not contain a body region, the process advances to step S409.

Figure 12:
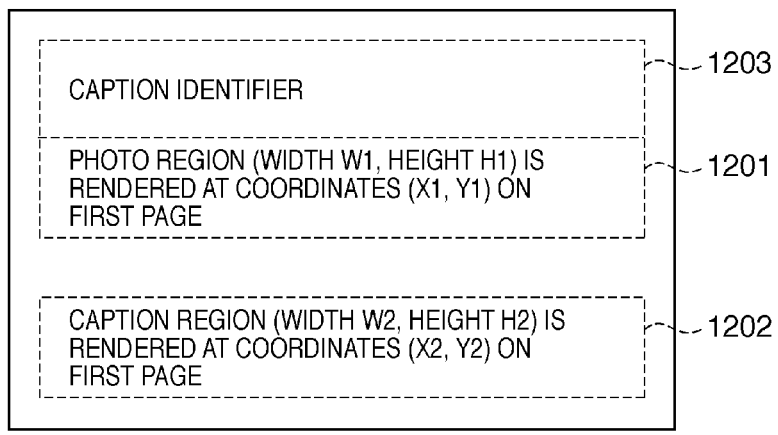
FIG. 12 is a view showing the outline of PDF data of the first page in the first embodiment.

In step S409, the format conversion unit 305 converts the image data 901 (first page) into PDF data based on information shown in FIG. 10 that is saved in the storage unit 111. FIG. 12 shows the outline of PDF data of the image data 901 (first page). In actual PDF data, objects 1201 and 1202 are described in rendering commands for rendering a photo region (photo object) and a caption region, respectively. A caption identifier 1203 is caption identifier 1 assigned in step S405, and is associated with the photo object 1201. A photo region rendering command is to render, at a rendering position at which a region has been extracted from an input image, image data obtained by JPEG-compressing the extracted photo region. When an object obtained by region division is a drawing object such as a line art or illustration, it is also possible to convert the object into vector data and render the vector data at a rendering position from which the object has been extracted. Conversion of an object such as a drawing into vector data can use a well-known vector conversion technique. It is also possible to convert even a text region such as a caption or body into vector data based on the character edge and save the vector data as rendering data. The character string of the character recognition result of a text region such as a caption or body may be associated with the text region so that the character string can be searched for.

In step S410, the MFP 100 transmits, to the client PC 101, the PDF data whose format has been converted in step S409.

In step S411, the MFP 100 determines whether it has transmitted all pages. If the MFP 100 has transmitted all pages, the process advances to step S413; if it has not, to step S412 to process the next page. In this case, the image data 901 is the first page, the second to fourth pages have not been processed yet, and thus the process advances to step S412.

Processing of Second to Fourth Pages

The image data 902 to 904 (second to fourth pages) undergo basically the same processing as that of the image data 901 (first page). In particular, a difference from the processing of the first page will be described. FIG. 11A shows information saved in the storage unit 111 for the image data 901 to 904 (first to fourth pages) upon the processes of steps S401 to S403.

In step S406, it is determined that the body region in the image data 904 (fourth page) contains the same expression as character information of the caption region. The process then advances to step S407. More specifically, the same expression as character information "FIG. 1" of the caption region 906 in the image data 901 exists in character information " . . . FIG. 1 is AAA. . . . " of the body region 909 in the image data 904.

In step S407, the metadata processing unit 304 extracts metadata for searching the body region for a region to which the caption belongs. In the first embodiment, "AAA" (e.g., a word suitable for a search keyword) is extracted as metadata for searching for the photo region 905 in the image data 901. An application can use "AAA" as a search keyword to search for the object of the photo region 905. Note that the metadata extraction method is not limited to this example. For example, entire character information " . . . FIG. 1 is AAA. . . . " in the body containing the same expression as character information of the caption may be used as metadata.

In step S408, the metadata processing unit 304 holds the metadata in association with the caption identifier. As described above, the caption identifier is "caption identifier 1" and metadata is "AAA", so "caption identifier 1" and "AAA" are held in association with each other.

After transmitting PDF data corresponding to the image data 901 to 904 (first to fourth pages) in step S410, it is determined in step S411 that the MFP 100 has transmitted all pages, that is, document images. The process advances to step S413.

In step S413, the metadata which has been held in step S408 and associated with the caption identifier is assigned to the PDF data whose format has been converted in step S409. The PDF data has been transmitted in step S410, so the metadata is transmitted to assign it to the transmitted PDF data in practice.

Figure 13A:
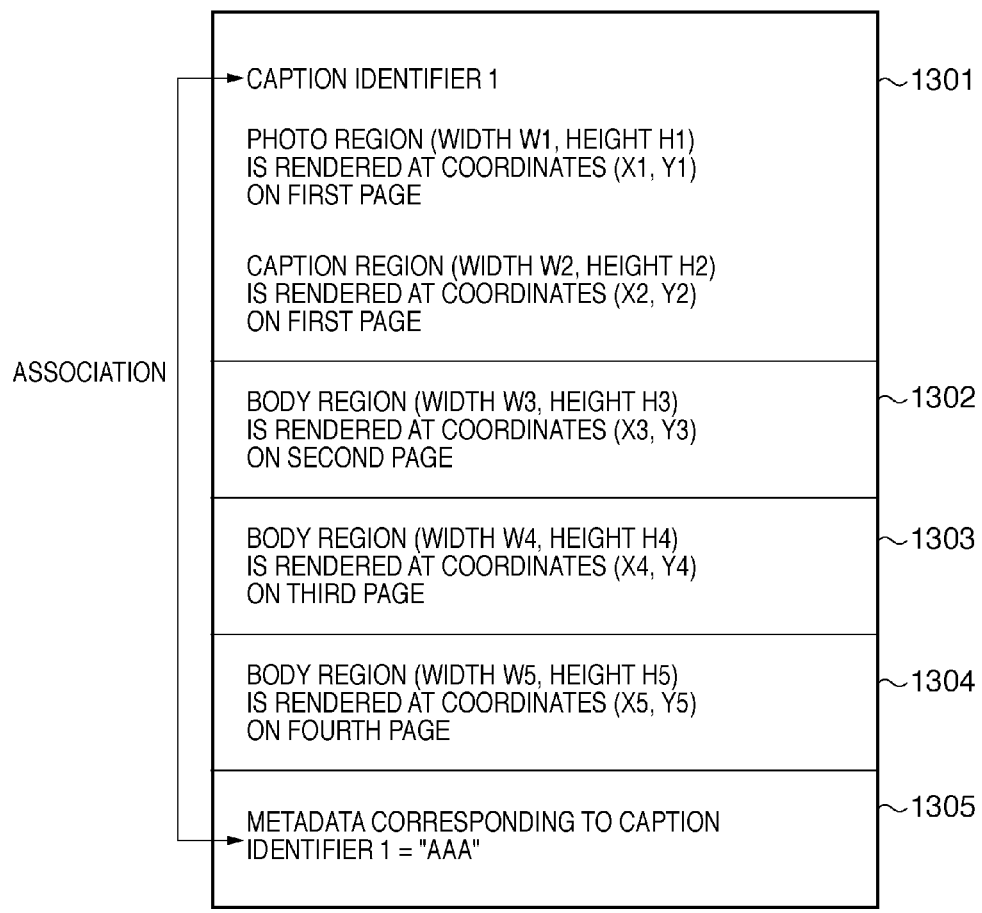
FIG. 13A is a view showing the outline of PDF data of the first to fourth pages and metadata in the first embodiment.

FIG. 13A shows the outline of all PDF data (first to fourth pages) and metadata transmitted to the client PC 101. In FIG. 13A, reference numerals 1301 to 1304 denote PDF data of the first to fourth pages. Metadata 1305 is assigned in correspondence with caption identifier 1. As is apparent from FIG. 13A, the photo region and metadata are associated with each other via caption identifier 1.

Figure 18:
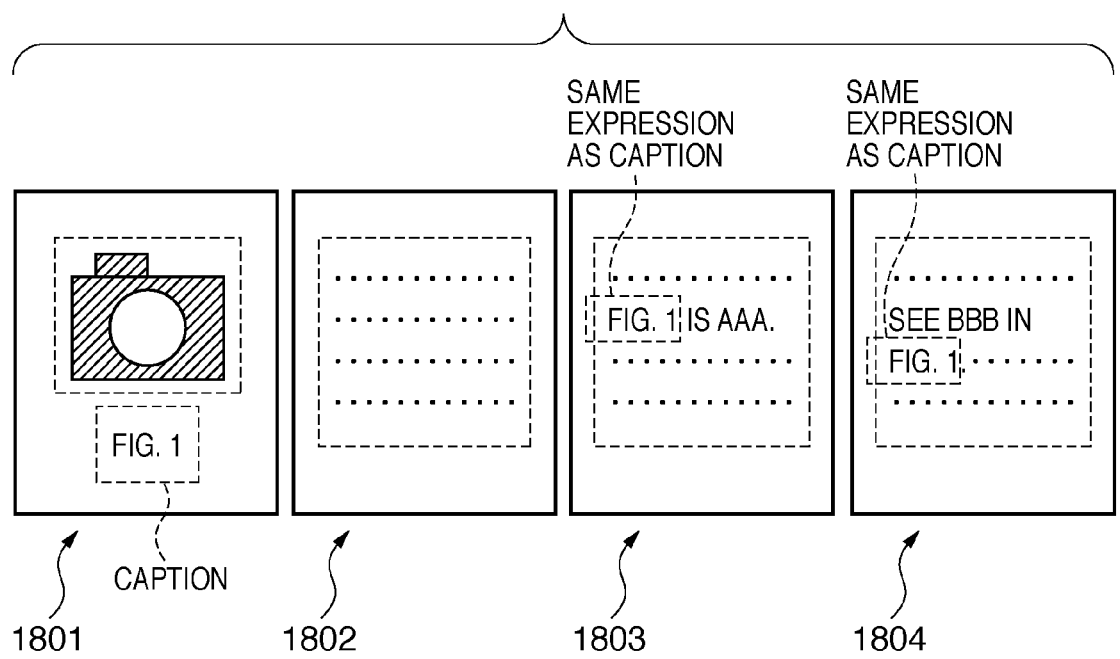
FIG. 18 is a view showing an example in which the same expression as a caption exists in different pages.

When the same expression as character information of a caption region exists in different pages, a plurality of metadata corresponding to the caption identifier are extracted. For example, as shown in FIG. 18, the same expression as the caption of image data 1801 is extracted from two image data 1803 (third page) and image data 1804 (fourth page). "AAA" is extracted as metadata from character information " . . . FIG. 1 is AAA. . . . " of the body region in the image data 1803. Also, "BBB" is extracted as metadata from character information " . . . See BBB in FIG. 1. . . . " of the body region in the image data 1804. In this case, either or both of "AAA" and "BBB" are associated with the caption identifier. The number of assignable metadata may be limited (e.g., it is permitted to assign up to three metadata). As a method of selecting either "AAA" or "BBB", for example, metadata extracted first can be selected.

Figure 17:
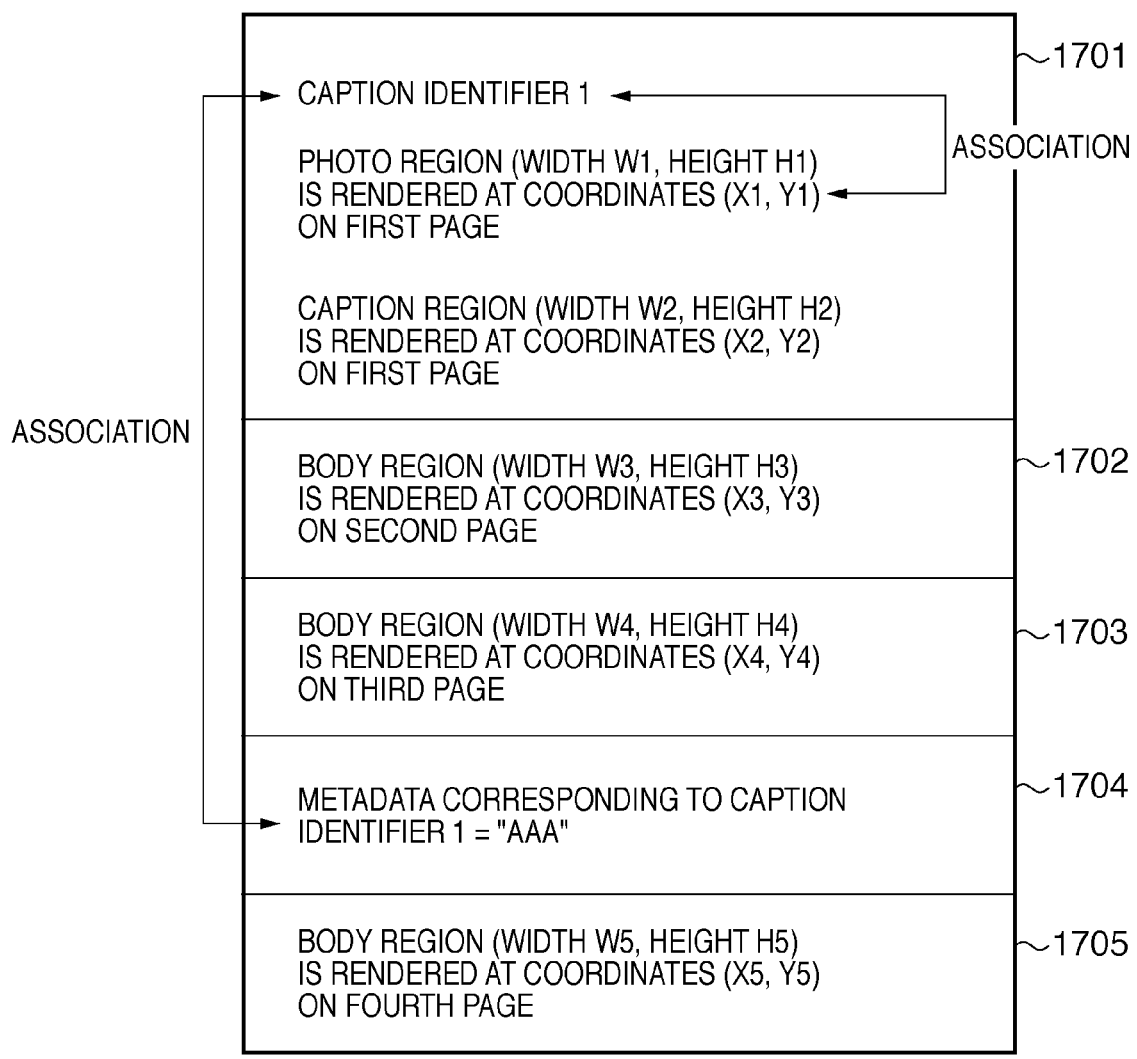
FIG. 17 is a view showing the outline of PDF data of the first to fourth pages in the first embodiment.

If metadata corresponding to a caption identifier assigned in step S405 has been extracted, it may be transmitted in step S413, instead of waiting for the end of transmitting all pages in step S411. For example, when the same expression as character information of a caption region exists in the body region of an intermediate page (third page), as shown in FIG. 16, metadata corresponding to a caption identifier is extracted from the third page. Hence, when the third page is transmitted in step S410, it is determined in step S411 that the metadata corresponding to the caption identifier has been extracted. In step S413, the metadata associated with the caption identifier is transmitted. In this case, the fourth page has not been transmitted yet, and the process needs to return to step S412 after step S413. FIG. 17 shows the outline of PDF data when transmitting metadata upon detecting it. In FIG. 17, the MFP 100 transmits data 1701 to 1703 of the first to third pages to the client PC 101, transmits metadata 1704 obtained from the third page, and then transmits data 1705 of the fourth page. FIG. 17 reveals that the metadata position (timing when metadata is transmitted) differs from that in FIG. 13A described above.

[Processing on Receiving Side]

Processing on the receiving side shown in the flowchart of FIG. 5 will be described. In this example, the client PC 101 on the receiving side receives PDF data of each page transmitted from the MFP 100 on the transmitting side, and finally receives metadata.

In step S501, the client PC 101 receives PDF data corresponding to the image data 901 (first page) transmitted in step S410 of FIG. 4.

In step S502, the client PC 101 determines whether it has received all pages. If the client PC 101 has received all pages, the process advances to step S503; if it has not, returns to step S501. By repeating step S501, the client PC 101 receives PDF data corresponding to the image data 902 to 904 (second to fourth pages).

In step S503, the client PC 101 receives metadata transmitted in step S413 of FIG. 4.

In step S504, the client PC 101 saves, in an internal storage area (not shown), the PDF data (first to fourth pages) received in step S501 together with the metadata received in step S503. In the embodiment, these data are saved as one multi-page PDF file.

[Search Processing]

Processing of searching for an object by the client PC 101 using the above-mentioned metadata as a search keyword will be explained with reference to FIGS. 14 and 15.

Figure 14:
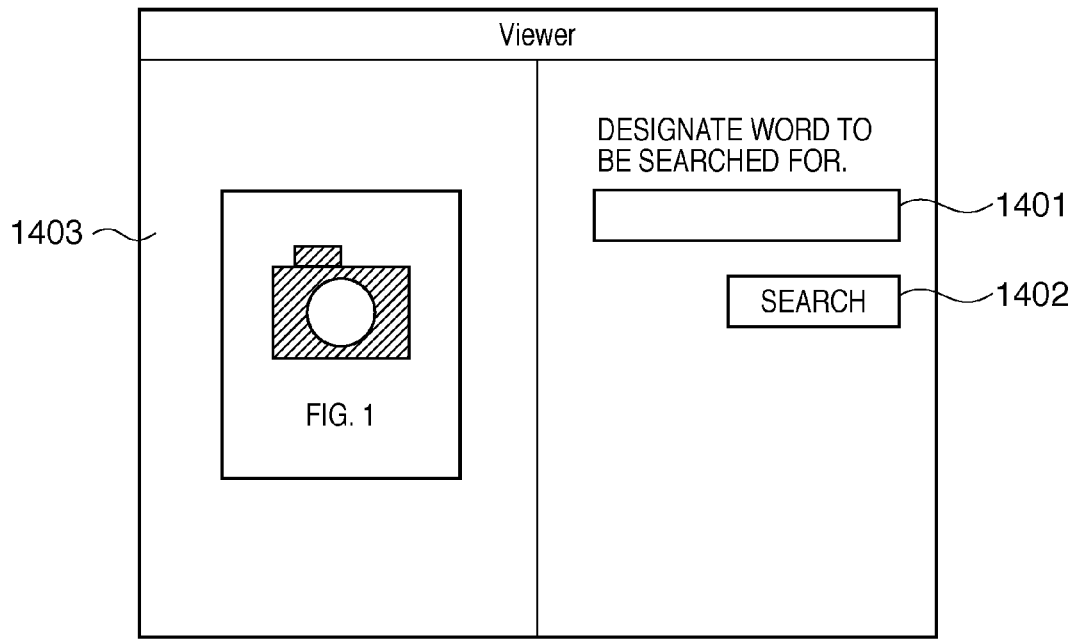
FIG. 14 is a view exemplifying an object search viewer in the first embodiment.

FIG. 14 exemplifies a viewer for searching for an object. In FIG. 14, a text box 1401 is used to designate a word to be searched for. A search execution button 1402 is used to designate execution of search after designating a word to be searched for. A page display window 1403 displays a multi-page PDF saved in step S504 of FIG. 5. Although the multi-page PDF in the embodiment is formed from four pages, the first page is displayed in FIG. 14.

Figure 15:
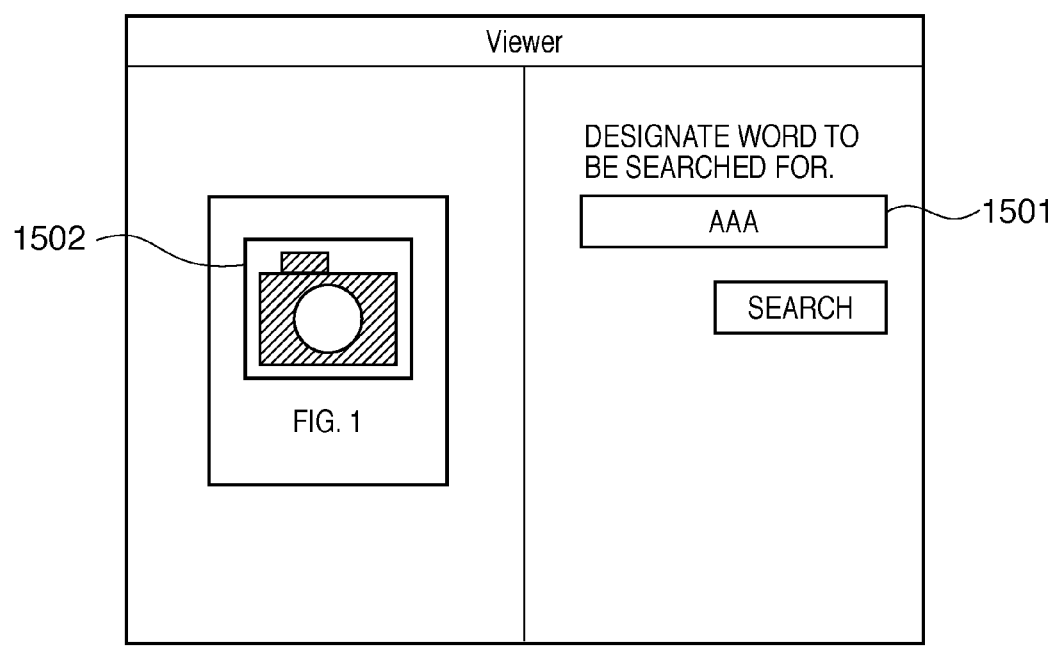
FIG. 15 is a view showing an object search result in the first embodiment.

FIG. 15 shows the result of designating a word to be searched for in the text box 1401 of FIG. 14 and executing search in response to pressing the search execution button 1402. In FIG. 15, "AAA" is designated as a word to be searched, as represented in a text box 1501. A page display window 1502 represents that "camera (photo)" was detected (hit) as a result of executing search. In the embodiment, "camera (photo)" can be searched for using the word "AAA" because of the caption identifier, as described above. More specifically, the metadata "AAA" is associated with "caption identifier 1", and "caption identifier 1" is associated with "camera" serving as the photo region 905.

As described above, according to the first embodiment, when document images of a plurality of pages are transmitted to a client PC, the client PC can easily search for an object having a caption. More specifically, even if a "page containing a caption adjacent to an object" is different from a "page containing the same expression as a caption", the client PC can search for the object using metadata as a search keyword. In this way, an object such as a photo or drawing can be searched for using a word used in the description of the object in the body.

Figure 8A:
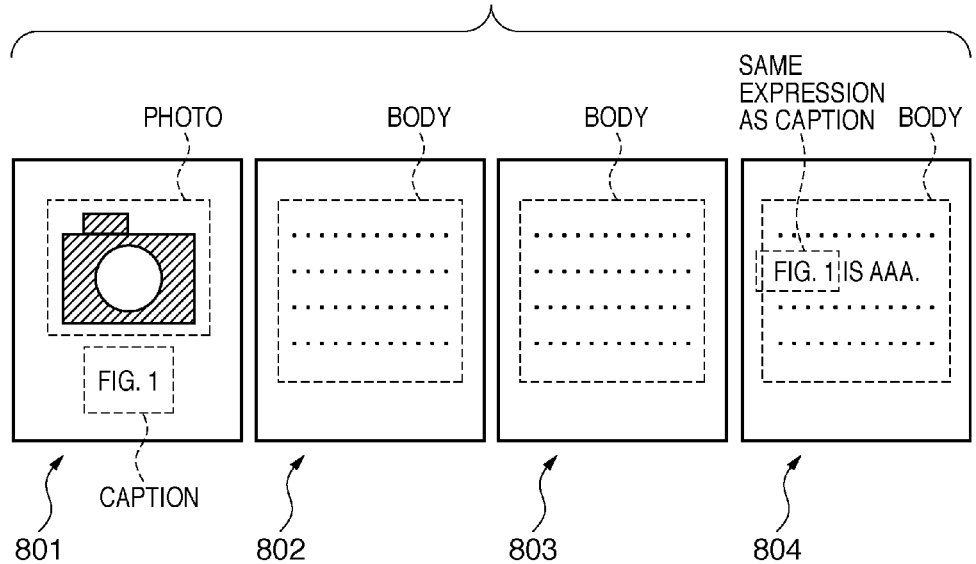
FIG. 8A is a view showing an example in which the "page of a body containing the same expression as a caption" follows a "page containing a caption"

Every time PDF data of one page is generated, it is transmitted, thereby saving the memory and increasing the transfer efficiency. For example, for document images made up of four pages as shown in FIG. 8A, the work memory, which needs to be 2 MB conventionally, can be reduced to 500 KB.

Second Embodiment

The second embodiment according to the present invention will be described. The first embodiment has explained a method of associating metadata with an object in order to search for the object and generating a multi-page PDF while saving the memory without decreasing the transfer efficiency. The second embodiment will explain an example of giving priority to higher performance in object search as long as a work memory enough to holding pages can be ensured.

If a sufficient work memory can be ensured, a page having a caption identifier can be held until the page of a body containing the same expression as the caption is detected. In this case, the description position of the caption identifier and that of metadata corresponding to the caption identifier can be arranged closer, for example, adjacent to each other. This arrangement improves the search performance when searching for an object on a viewer.

The system configuration in the second embodiment is the same as that in the first embodiment, and a description thereof will not be repeated. Also in the second embodiment, an MFP 100 converts image data of a plurality of pages into a multi-page PDF and transmits the multi-page PDF to a client PC 101. In the second embodiment, the transmission processing is switched between a case in which a work memory enough to hold pages can be ensured and a case in which the work memory is insufficient.

Figure 19:
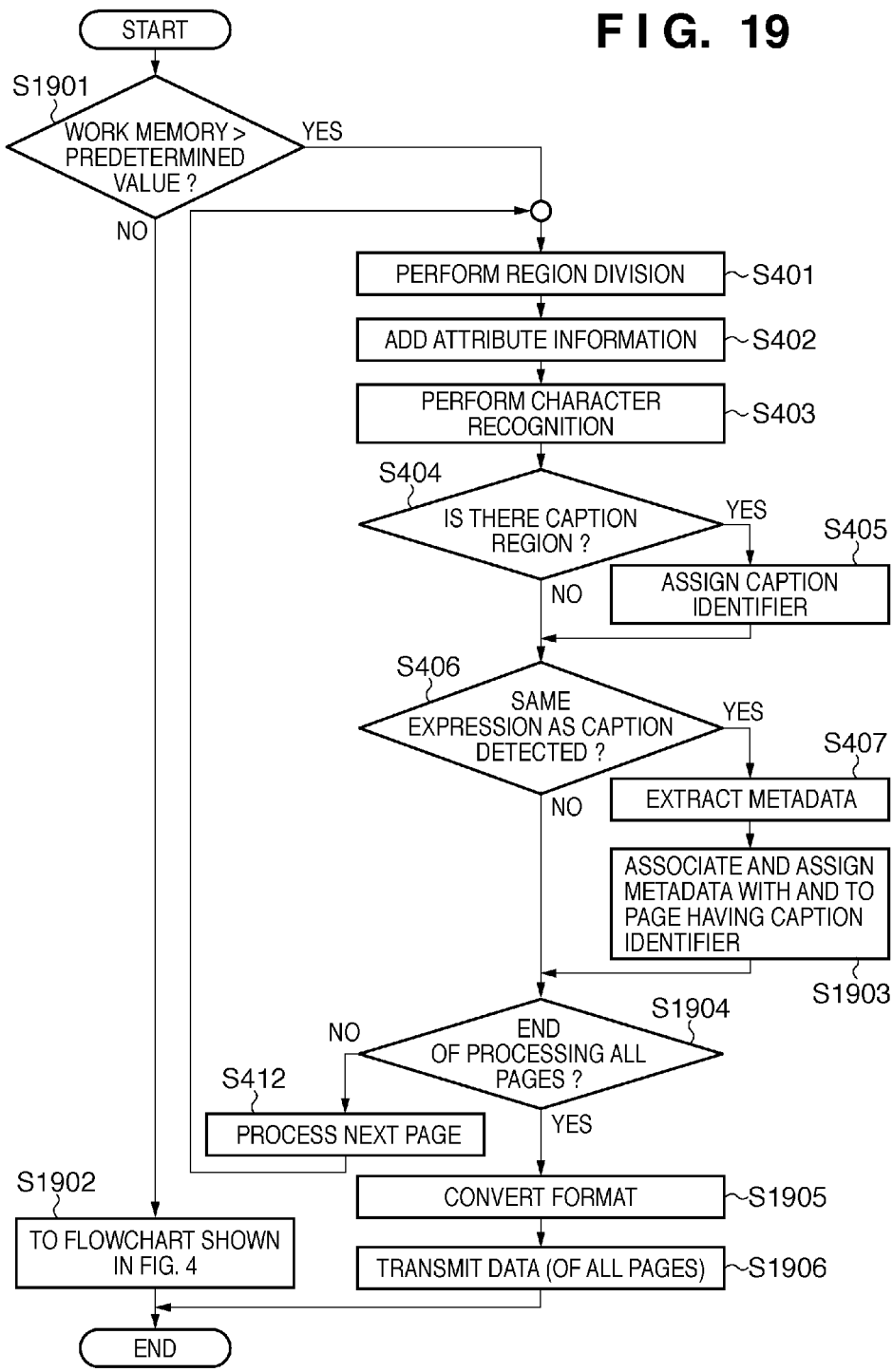
FIG. 19 is a flowchart showing processing on the transmitting side in the second embodiment.

The switching method will be explained with reference to the flowchart of FIG. 19 showing processing on the transmitting side in the second embodiment. Image data 901 to 904 of a plurality of pages shown in FIG. 9A are assumed to be input. The same step numbers as those in FIG. 4 in the first embodiment denote the same processes, and a description thereof will not be repeated.

In step S1901, it is determined whether a work memory for holding pages is larger than a predetermined value. More specifically, a counter (not shown) counts the number of document sheets set on an image reading unit 110 of the MFP 100. A work memory necessary to hold all the pages is calculated. After that, it is determined whether the memory can be ensured in a storage unit 111 of the MFP 100. Note that a sensor (not shown) in the ADF of the image reading unit 110 may count the number of read sheets as the number of stacked sheets. Alternatively, the user may input the number of read sheets via a user interface (not shown).

If it is determined in step S1901 that the work memory is equal to or smaller than the predetermined value, the process advances to step S1902. In step S1902, the same processes as those in the first embodiment, that is, the same processes as those in the flowchart shown in FIG. 4 are performed, generating PDF data as shown in FIG. 13A.

If it is determined in step S1901 that the work memory is larger than the predetermined value, for example, if a work memory capable of holding all the pages of document images can be ensured, the process advances to step S401 in FIG. 19. In steps S401 to S407 and S412, the same processes as those in FIG. 4 are executed.

In the second embodiment, after metadata for searching for a region to which a caption belongs is extracted from a body region in step S407, the process advances to step S1903.

In step S1903, the metadata is associated with and assigned to a page having a caption identifier. The difference from step S408 of FIG. 4 is as follows. In step S408, metadata is only held in association with a caption identifier. To the contrary, in step S1903, metadata is assigned to a page having a caption identifier. This is possible because all the pages of the image data 901 to 904 shown in FIG. 9A are held.

In step S1904, it is determined whether all the pages have been processed. If all the pages have been processed, the process advances to step S1905; if an unprocessed page remains, to step S412.

In step S1905, as well as step S409, a format conversion unit 305 converts image data into PDF data. In step S1905, however, all the pages of document images are converted into PDF data, thereby creating transmission data in the second embodiment.

In step S1906, the MFP 100 simultaneously transmits, to the client PC 101, PDF data (transmission data) of all the pages whose format have been converted in step S1905.

FIG. 20 shows the outline of all PDF data (first to fourth pages) and metadata transmitted to the client PC 101, which are generated in the above-described manner in the second embodiment. As is apparent from FIG. 20, metadata 2001 is associated with a page having a caption identifier, and assigned immediately after the page.

As described above, according to the second embodiment, when a work memory enough to hold pages can be ensured, it is possible to arrange the description position of a caption identifier and that of metadata corresponding to the caption identifier to be close to each other, and then transmit image data. The second embodiment can therefore improve the search performance when searching for an object on a viewer.

Third Embodiment

The third embodiment according to the present invention will be described.

Figure 8B:
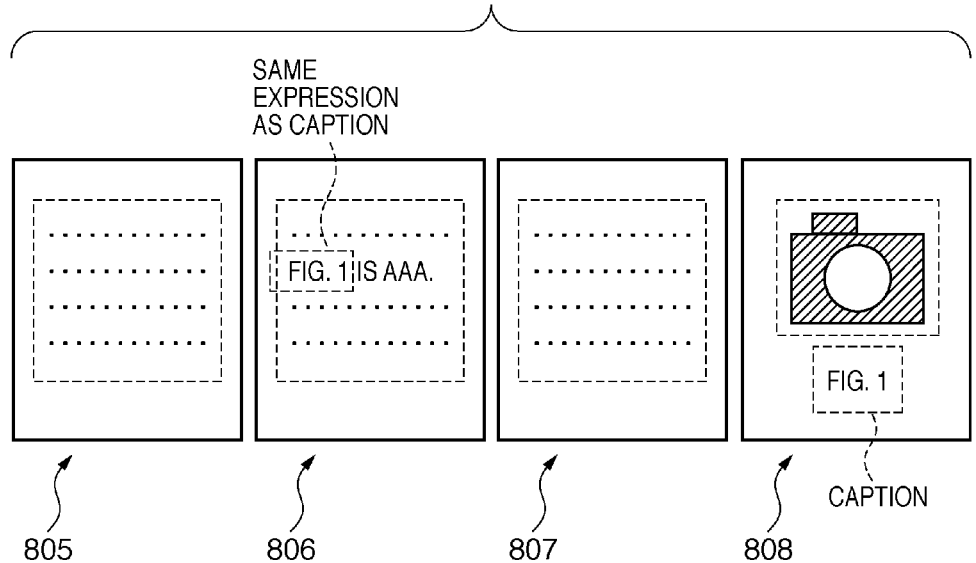
FIG. 8B is a view showing an example in which the "page of a body containing the same expression as a caption" precedes a "page containing a caption adjacent to an object"

In the first embodiment, when a "page containing a caption adjacent to an object" is different from the "page of a body containing the same expression as a caption", a caption identifier is assigned to a region having the caption attribute. This example is effective when the "page of a body containing the same expression as a caption" follows a "page containing a caption adjacent to an object", as shown in FIG. 8A. However, no metadata can be extracted when, for example, the "page of a body containing the same expression as a caption" precedes a "page containing a caption adjacent to an object", as shown in FIG. 8B. In other words, no caption identifier can be assigned to a body region in the "page of a body containing the same expression as a caption". In this case, the problem of increasing a work memory for holding pages to associate object search metadata with an object still remains unsolved.

To solve this problem, the third embodiment will describe an example of associating metadata with an object in order to search for the object even when the "page of a body containing the same expression as a caption" precedes a "page containing a caption adjacent to an object".

The system configuration in the third embodiment is the same as that in the foregoing first embodiment, and a description thereof will not be repeated. Also in the third embodiment, an MFP 100 converts image data of a plurality of pages into a multi-page PDF and transmits the multi-page PDF to a client PC 101.

[Processing on Transmitting Side]

Figure 21A:
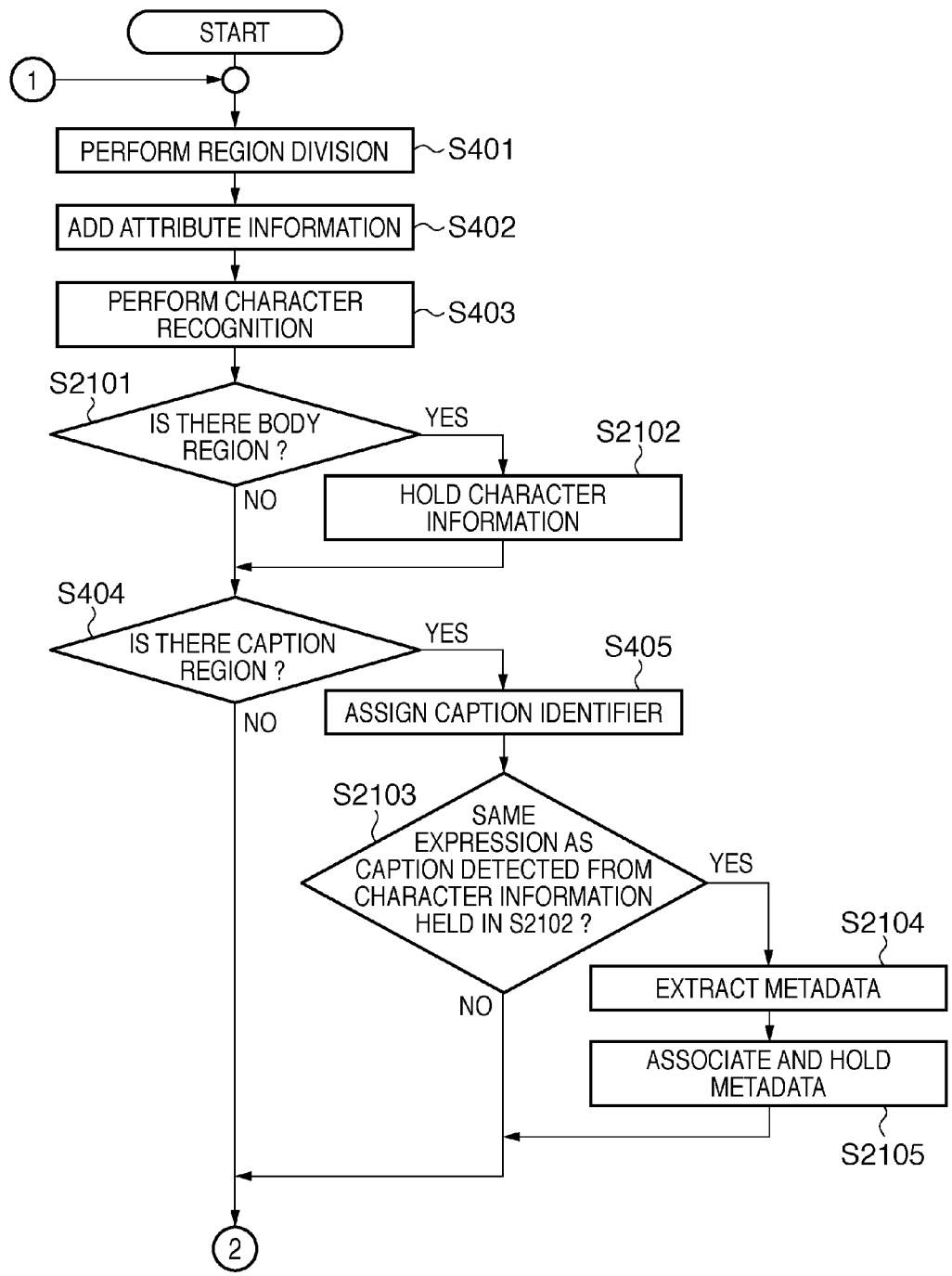
FIGS. 21A and 21B are flowcharts showing processing on the transmitting side in the third embodiment.
Figure 21B:
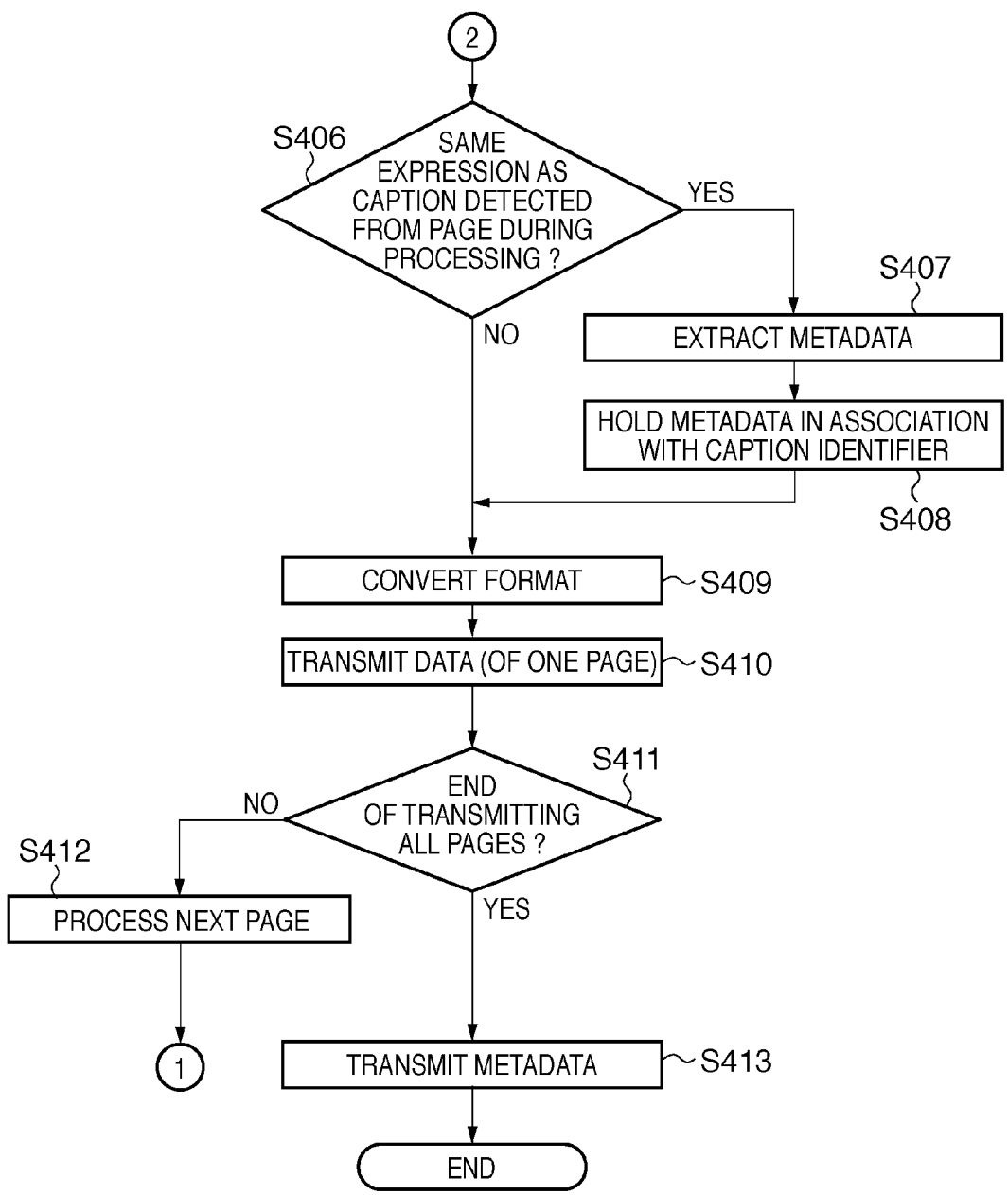

Processing on the transmitting side in an image processing system according to the third embodiment will be explained with reference to the flowcharts of FIGS. 21A and 21B. Image data 911 to 914 of a plurality of pages shown in FIG. 9B are assumed to be input. FIG. 9B exemplifies document images formed from four pages, similar to FIG. 8B. The image data 911 to 914 are the first to fourth pages in order. FIG. 11B shows information saved in a storage unit 111 for the image data 911 to 914 (first to fourth pages) upon the processes of steps S401 to S403. In the flowcharts of FIGS. 21A and 21B, the same step numbers as those in FIG. 4 in the first embodiment denote the same processes, and a description thereof will not be repeated.

Processing of First Page

In steps S401 to S403, the input image data 911 (first page) undergoes region division, attribute information addition, and character recognition processing. The storage unit 111 saves information on the position, size, and the like of a region, page information, the attribute of the region, and character information of the region, which have been extracted in preceding processes. FIG. 11B shows information saved in the storage unit 111 for the image data 911 (first page). In FIG. 11B, reference numeral 915 denotes information saved in the storage unit 111 for a body region 915 in the image data 911 (first page).

In step S2101, a metadata processing unit 304 determines whether the image data 911 contains a body region (region having the body attribute). If the image data 911 contains a body region, the process advances to step S2102; if it does not contain a body region, to step S404. Since the image data 911 contains the body region 915, the process advances to step S2102.

In step S2102, the metadata processing unit 304 holds character information (i.e., character code) obtained as the character recognition result of the body region 915. The character information is held to determine whether the character information held in step S2102 contains the same expression as character information of a caption region saved in processing a "page containing a caption adjacent to an object", that is, the image data 914 (fourth page) (to be described later). At this time, the work memory increases if all pieces of the image data 911 are held. Thus, only character information of a small data size is held. For example, character information of one page has a data size of about several ten KB though it depends on the amount of character information in a document image.

In step S404, the metadata processing unit 304 determines whether the image data 911 contains a caption region (region having the caption attribute). If the image data 911 contains a caption region, the process advances to step S405; if it does not contain a caption region, to step S406. Since the image data 911 does not contain a caption region, the process advances to step S406.

In step S406, the metadata processing unit 304 determines whether the body region (region having the body attribute) contains the same expression as character information of the caption region. If the body region contains the same expression, the process advances to step S407; if it does not contain the same expression, to step S409. Although the image data 911 is a body region, character information of a caption region is not saved in the storage unit 111 yet at the time of processing the first page, so the process advances to step S409. Note that character information of a caption region is saved in the storage unit 111 upon processing the image data 914 (fourth page) (to be described later).

In step S409, a format conversion unit 305 converts the image data 911 (first page) into PDF data based on information represented by the body region 915 in FIG. 11B that is saved in the storage unit 111.

In step S410, the MFP 100 transmits, to the client PC 101, the PDF data whose format has been converted in step S409.

In step S411, the MFP 100 determines whether it has transmitted all pages. If the MFP 100 has transmitted all pages, the process advances to step S413; if it has not, to step S412 to process the next page. In this case, the image data 911 is the first page, the second to fourth pages have not been processed yet, and thus the process advances to step S412.

Processing of Second to Fourth Pages

The image data 912 to 914 (second to fourth pages) undergo basically the same processing as that of the image data 911 (first page). Especially, a difference from the processing of the first page will be described.

Similar to the image data 911 (first page), the storage unit 111 holds pieces of character information of body regions 916 and 917 in the image data 912 and 913 (second and third pages) in step S2102. After the end of processing the image data 913 (third page), the storage unit 111 holds pieces of character information of the body regions 915 to 917. The image data 912 and 913 (second and third pages) do not contain a caption region, and the storage unit 111 does not hold character information of a caption region. Hence, NO is determined in both steps S404 and S406, and the MFP 100 transmits PDF data to the client PC 101 in step S410.

In step S2101, it is determined that the image data 914 (fourth page) does not contain a body region. Thus, the process advances to step S404.

In step S404, it is determined that the image data 914 contains a caption region 919. The process then advances to step S405.

In step S405, the metadata processing unit 304 assigns a caption identifier. As described above, metadata for searching for a region to which a caption belongs is unknown until the page of a body containing the same expression as the caption is detected. In the third embodiment, however, the "page of a body containing the same expression as a caption" precedes a "page containing a caption adjacent to an object". Therefore, in subsequent steps S2103 to S2105, metadata can be extracted. Similar to the first embodiment, "caption identifier 1" is assumed to be used as the caption identifier. When a plurality of caption identifiers are necessary, they are numbered like "caption identifier 2" and "caption identifier 3".

In step S2103, it is determined whether the body region held in the storage unit 111 in step S2102 contains the same expression as character information of the caption region. If the body region contains the same expression, the process advances to step S2104; if it does not contain the same expression, to step S406. In this case, it is determined that the body region held in the storage unit 111 contains the same expression as character information of the caption region in the image data 914 (fourth page). Thus, the process advances to step S2104. More specifically, the same expression as character information "FIG. 1" of the caption region 919 in the image data 914 exists in character information "... FIG. 1 is AAA...." of the body region 916 in the image data 912.

In step S2104, the metadata processing unit 304 extracts metadata for searching the body region for a region to which the caption belongs. In the third embodiment, "AAA" is extracted as metadata for searching for a photo region 918 in the image data 914.

In step S2105, the metadata processing unit 304 associates the metadata with the caption identifier and holds them. As described above, the caption identifier is "caption identifier 1" and metadata is "AAA", so "caption identifier 1" and "AAA" are held in association with each other.

In step S406, the metadata processing unit 304 determines whether the body region (region having the body attribute) contains the same expression as character information of the caption region. Since the image data 914 (fourth page) does not contain a body region, the process advances to step S409.

In steps S409 to S411, the same processes as those in the first embodiment described above are executed.

If it is determined in step S411 that the MFP 100 has transmitted all pages, the metadata which has been held in step S2105 and associated with the caption identifier is assigned in step S413 to the PDF data whose format has been converted in step S409. Note that the PDF data has been transmitted in step S410, so the metadata is transmitted to assign it to the PDF data.

Figures 13B, 13C:
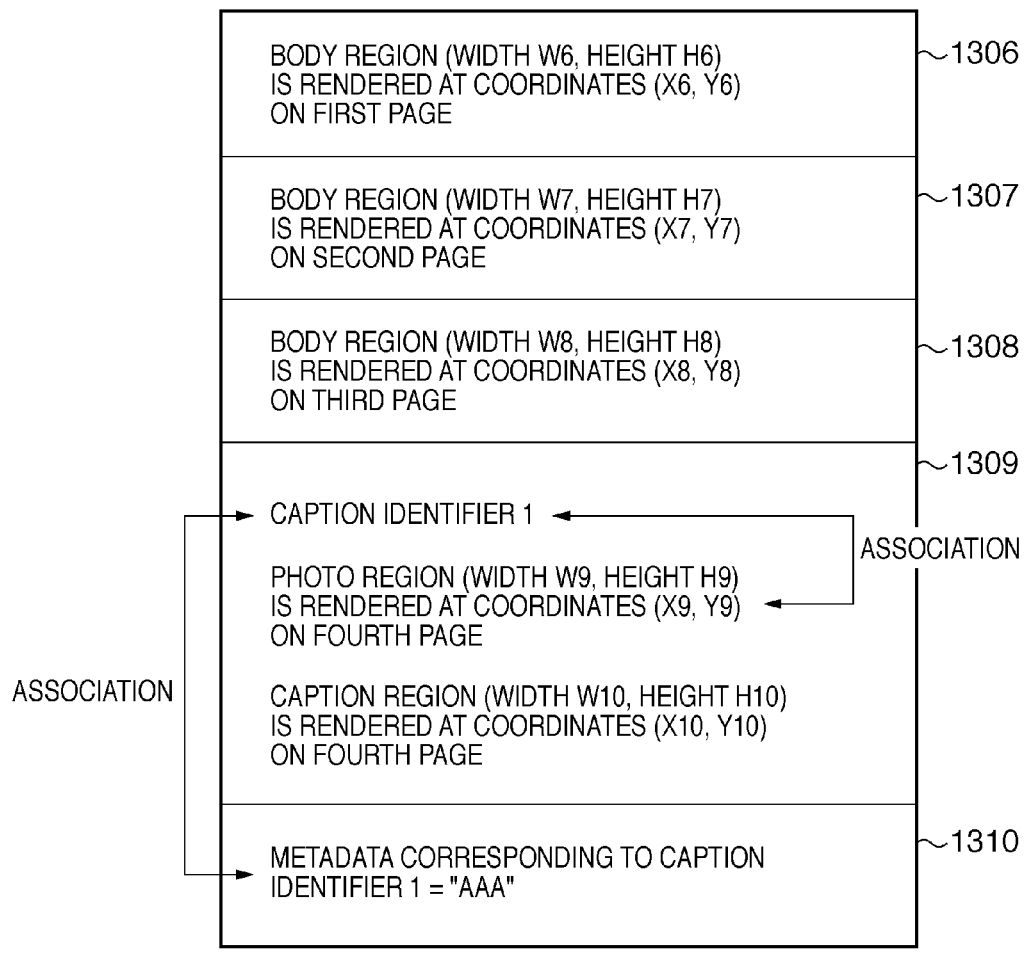
FIG. 13B is a view showing the outline of PDF data of the first to fourth pages and metadata in the third embodiment.
FIG. 13C is a view showing a concrete example of PDF data in the third embodiment.

FIG. 13B shows the outline of all PDF data (first to fourth pages) and metadata transmitted to the client PC 101. In FIG. 13B, reference numerals 1306 to 1309 denote PDF data of the first to fourth pages. Metadata 1310 is assigned in correspondence with caption identifier 1. As is apparent from FIG. 13B, the photo region and metadata are associated with each other via caption identifier 1. FIG. 13C exemplifies a caption identifier in actual PDF data, and a photo region rendering command. In FIG. 13C, reference numeral 1311 denotes a caption identifier; and 1312, a photo region rendering command.

As described above, according to the third embodiment, even when the "page of a body containing the same expression as a caption" precedes a "page containing a caption adjacent to an object", search metadata can be associated with an object. Every time PDF data is generated, the data of one page is transmitted, thereby saving the memory and increasing the transfer efficiency. For example, for document images made up of four pages as shown in FIG. 8B, the work memory, which needs to be 2 MB (500 KB×4 pages) conventionally, can be reduced to 500 KB+several ten KB (500 KB×1 page+ character information (several ten KB)).

Figure 9C:
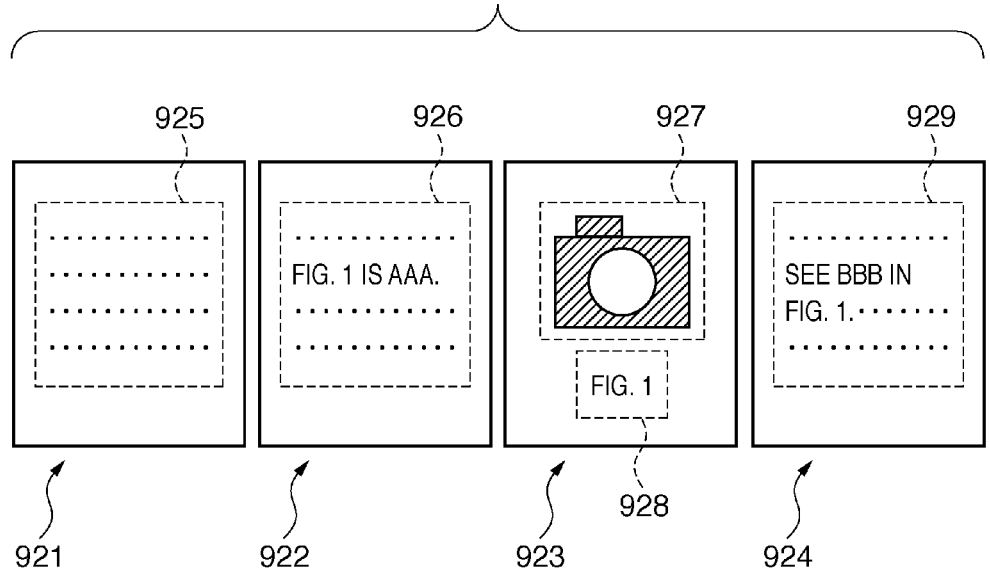
FIG. 9C is a view showing an example in which the same expression as a caption exists before and after a page containing the caption in the third embodiment.

Also in the third embodiment, when the same expression as character information of a caption region exists in different pages, a plurality of metadata corresponding to the caption identifier are extracted. A case will be considered, in which the "pages of bodies containing the same expression as a caption" exist before and after a "page containing a caption adjacent to an object". For example, in a case as shown in FIG. 9C, the same expression as a caption region 928 of image data 923 (third page) is extracted from two image data 922 (second page) and image data 924 (fourth page). In this case, "AAA" is extracted as metadata from character information "... FIG. 1 is AAA...." of a body region 926 in the image data 922. Also, "BBB" is extracted as metadata from character information "... See BBB in FIG. 1...." of a body region 929 in the image data 924. In this case, either or both of "AAA" and "BBB" are associated with the caption identifier. As a method of selecting either "AAA" or "BBB", for example, metadata extracted first can be selected.

Fourth Embodiment

The fourth embodiment according to the present invention will be described. The third embodiment has described an example of preventing an increase in work memory by holding only character information of a small data size in step S2102 of FIG. 21A. For example, character information of one page has a data size of about several ten KB though it depends on the amount of character information in a document image. The fourth embodiment further reduces the amount of information to be held by limiting character information to be held.

The system configuration in the fourth embodiment is the same as that in the first embodiment described above, and a description thereof will not be repeated. Also in the fourth embodiment, an MFP 100 converts image data of a plurality of pages into a multi-page PDF and transmits the multi-page PDF to a client PC 101.

[Processing on Transmitting Side]

Figure 9D:
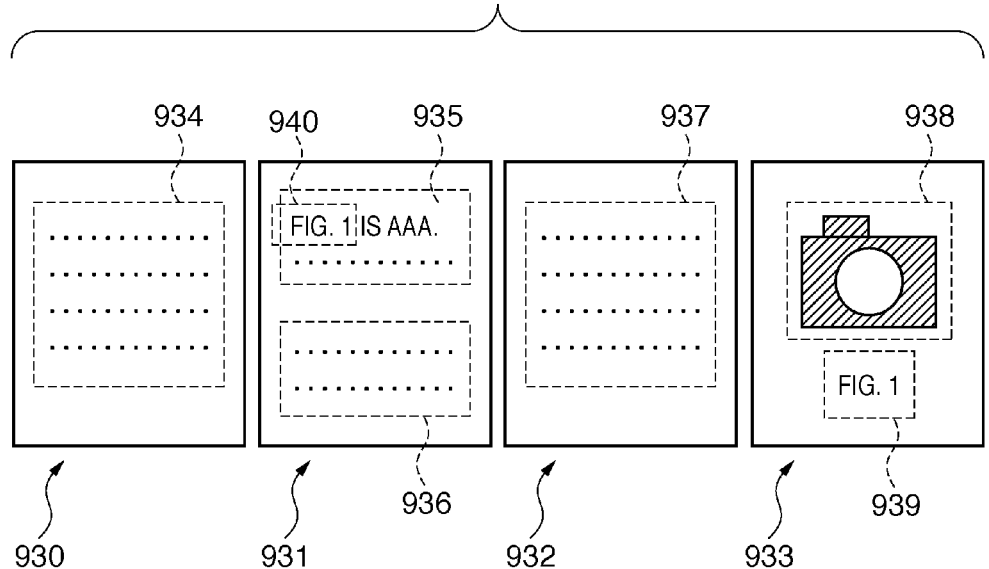
FIG. 9D is a view exemplifying image data of a plurality of pages to be processed in the fourth embodiment.
Figure 22A:
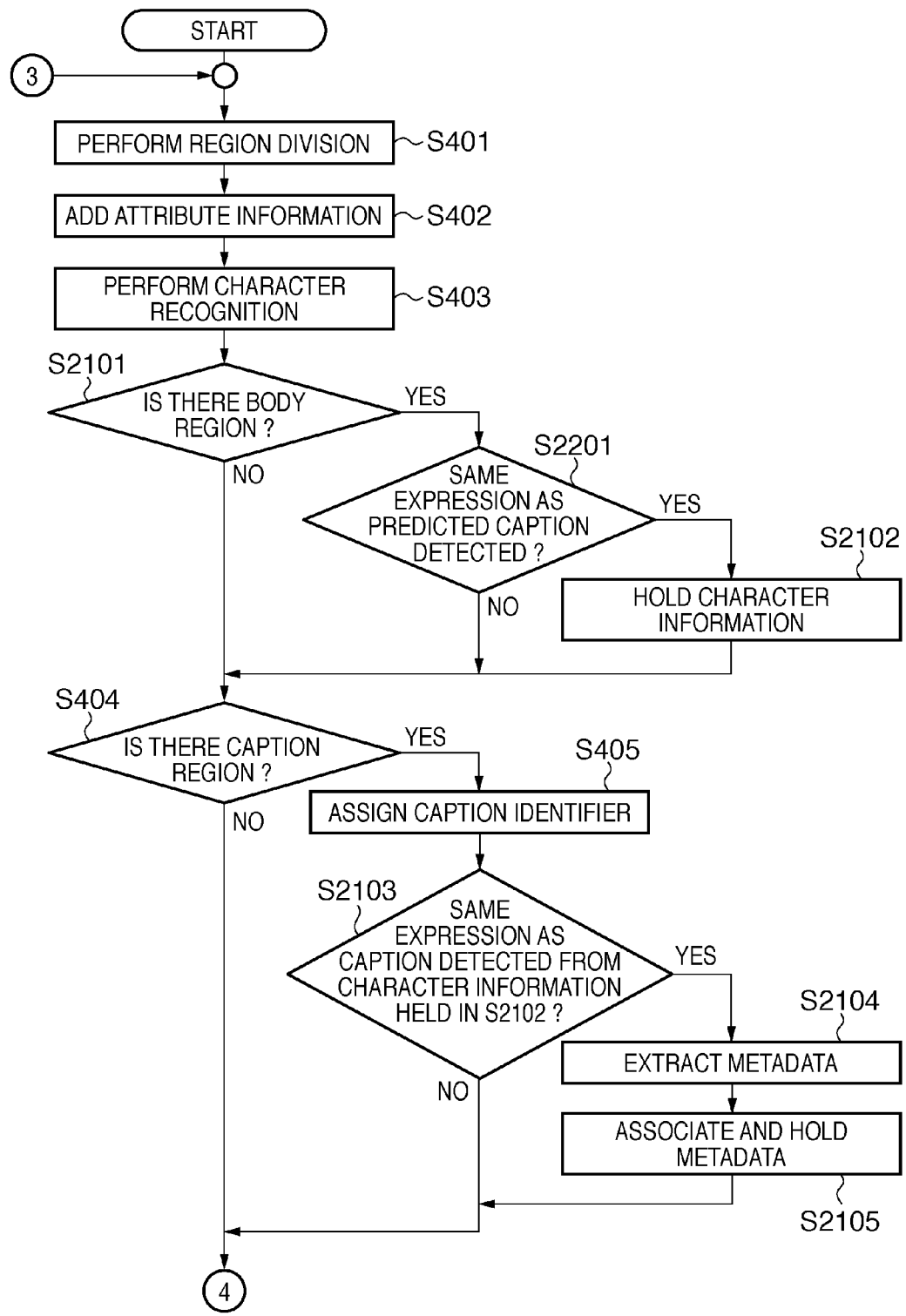
FIGS. 22A and 22B are flowcharts showing processing on the transmitting side in the fourth embodiment.
Figure 22B:
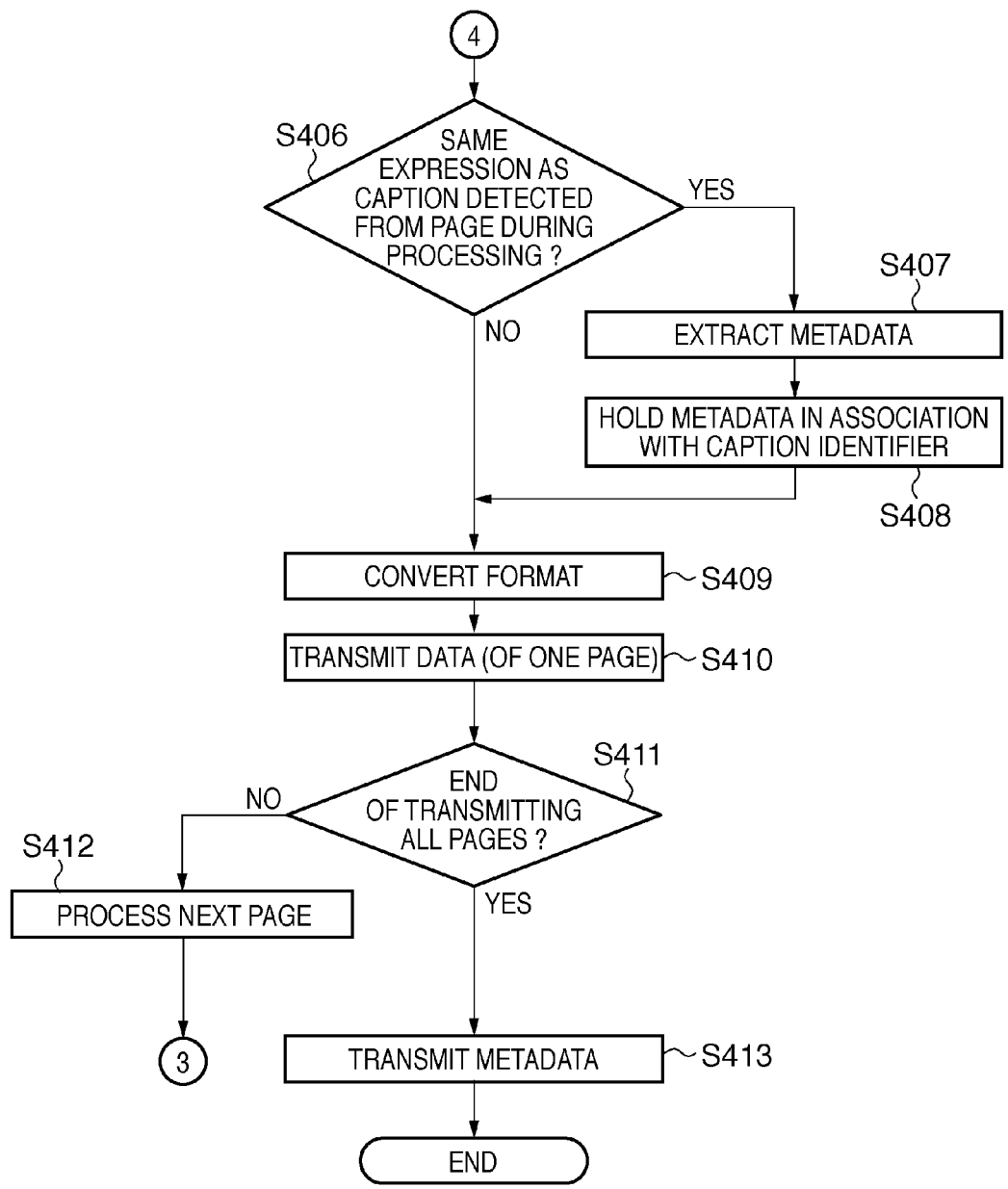

Processing on the transmitting side in an image processing system according to the fourth embodiment will be explained with reference to the flowcharts of FIGS. 22A and 22B. Image data 930 to 933 of a plurality of pages (first to fourth pages) shown in FIG. 9D are assumed to be input. FIG. 11C shows information saved in a storage unit 111 for the image data 930 to 933 (first to fourth pages) upon the processes of steps S401 to S403. The flowchart of FIG. 22A is different in only step S2201 from that of FIG. 21A described in the third embodiment. The same step numbers denote the same processes, and a description thereof will not be repeated.

Step S2201 is executed when it is determined in step S2101 that image data contains a body region (region having the body attribute). In step S2201, the same expression as a predicted caption defined in advance is searched for. If the same expression is detected, character information is held in step S2102. The predicted caption is caption information defined in advance as character information which often appears adjacent to an object. The predicted caption is, for example, "Fig, figure number, figure, right figure, or upper figure". In the fourth embodiment, when the same expression as one of these predicted captions is detected from a body region, character information is held.

When the image data 931 (second page) is input, it contains body regions 935 and 936 and a predicted caption 940. The entire character information in the body region 935 containing the predicted caption is held as represented by a cell 1102 in FIG. 11C. In contrast, character information in the body region 936 containing no predicted caption is not held as represented by a cell 1103 in FIG. 11C. Similarly, no predicted caption appears in the body regions of the image data 930 and 932, so no character information is held as represented by cells 1101 and 1104 in FIG. 11C.

As described above, the fourth embodiment can reduce the data size of character information by controlling character information held in step S2201.

It is also possible to hold only words "is AAA." near a predicted caption, instead of holding the entire character information " . . . FIG. 1 is AAA. . . . " as represented by the cell 1102 in FIG. 11C. This can further reduce the data size of character information.

<Modification>

In the foregoing embodiments, the metadata processing unit 304 determines whether the same expression as character information of a caption region exists in a body region (region having the body attribute). However, a synonymous expression may be determined. For example, character information of a caption region is "FIG. 1", and a body region contains not the same expression "FIG. 1" but "FIG. 1". In this case, it may be interpreted that "FIG. 1" and "FIG. 1" are synonymous.

Figure 8C:
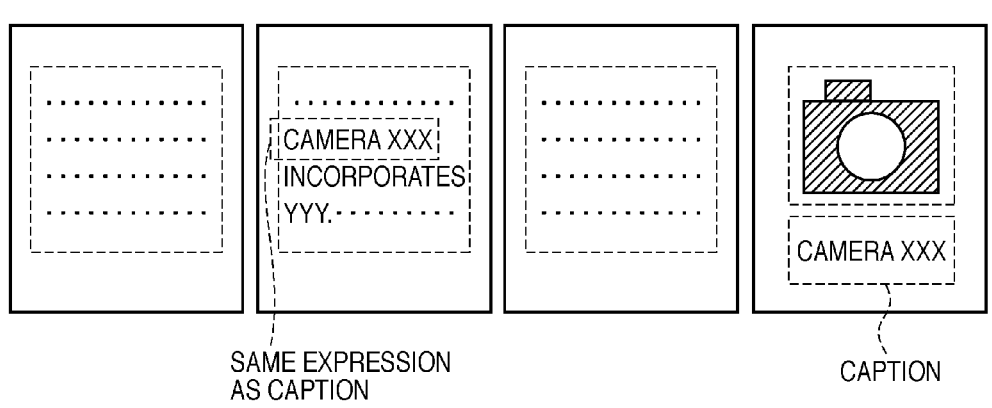
FIG. 8C is a view showing an example in which character information concerning an object serves as a caption.

In the above embodiments, the caption is a figure number (e.g., Fig, figure number, figure, right figure, upper figure), but is not limited to it. The caption can be any character information as long as character information is adjacent to an object or even if it is not adjacent to an object, pertains to an object. For example, the present invention is applicable to a case in which the fourth page contains a caption "camera XXX" and the second page contains the same expression "camera XXX" as the caption, as shown in FIG. 8C. In this case, two metadata "camera XXX" and "YYY" are associated with the photo object of the camera.

Figure 8D:
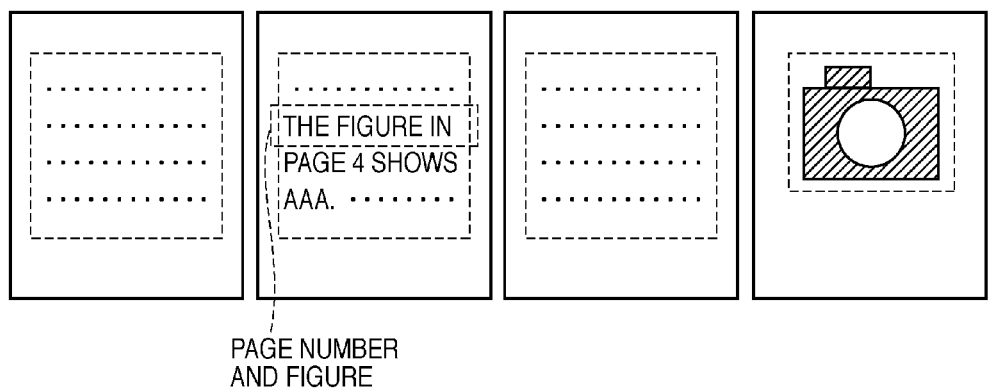
FIG. 8D is a view showing an example of associating metadata even when no caption exists in a page containing an object.

If no caption exists in a page containing a photo object but the descriptions of a page number and "figure, image, or table" exist in a different page, metadata can be associated with the photo object. For example, if no caption exists in a page (fourth page) containing the photo object of a camera, as shown in FIG. 8D, a description "the figure in page 4 shows AAA." exists in the second page. Hence, metadata "AAA" is associated with the photo object of the camera.

In the above-described example, PDF data is transmitted for each page. However, the present invention is effective when transmitting data in a predetermined unit, for example, every plurality of pages.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-026691, filed Feb. 6, 2009, which is hereby incorporated by reference herein in its entirety.

What is claimed is:

1. An image processing apparatus which generates metadata for searching for an object in document images formed from a plurality of pages and transmits the metadata to an external apparatus, comprising:

a region division unit configured to divide each page in the document images into regions in accordance with attributes, the divided regions including a body region having a body attribute and a caption region having a caption attribute adjacent to an object;

a character recognition unit configured to perform character recognition for the caption region and the body region divided by said region division unit, thereby obtaining character information of the body region and character information of the caption region;

a first assignment unit configured to assign an identifier to the object adjacent to the caption region, the identifier being an identifier for identifying the caption region;

a metadata extraction unit configured to detect the character information of the body region containing an expression synonymous with the character information of the caption region, and extract, as metadata of the object, character information including information other than the expression synonymous with the character information of the caption region from the detected character information of the body region;

a second assignment unit configured to assign the same identifier that is assigned by the first assignment unit to the metadata extracted by the metadata extraction unit;

a document image transmission unit configured to transmit, in a predetermined page unit, information of the object to which the identifier has been assigned by the first assignment unit; and a metadata transmission unit configured to transmit, in order to associate the metadata with the object, the metadata to which the same identifier has been assigned by the second assignment unit after processes of the region division unit, the character recognition unit, the first assignment unit, the metadata extraction unit, the second assignment unit and the document image transmission unit are executed for all of the plurality of pages.

2. The apparatus according to claim 1, wherein the document image transmission unit transmits, in one page unit, the information of the object to which the identifier has been assigned by the first assignment unit.

3. The apparatus according to claim 1, further comprising:

a transmission data creation unit configured to, when a work memory capable of holding all pages of the document images can be ensured, arrange information of the object and the metadata to be close to each other by using the work memory, and create transmission data of all pages of the document images; and a simultaneous transmission unit configured to simultaneously transmit the transmission data of all pages created by said transmission data creation unit, wherein, when the work memory capable of holding all pages of the document images cannot be ensured, the processes of said region division unit, said character recognition unit, said first assignment unit, said metadata extraction unit, said second assignment unit, said document image transmission unit and said metadata transmission unit are executed.

4. The apparatus according to claim 1, further comprising a holding unit configured to hold character information of a body region in a page preceding a page of the object, wherein said metadata extraction unit extracts the metadata from the character information stored in said holding unit.

5. The apparatus according to claim 4, wherein when the character information of the body region in the page preceding the page of the object represents a character string of a predicted caption defined in advance, said holding unit holds the character information of the body region.

6. The apparatus according to claim 1, wherein said region division unit divides, as the caption region, a region which is formed from a character and exists near either of upper and lower portions of the object.

7. The apparatus according to claim 1, wherein said region division unit divides each page in the document images into regions each having an attribute of one of a table, photo, drawing, line art, caption, body, and title.

8. The apparatus according to claim 1, further comprising a conversion unit configured to convert an object divided by said region division unit into vector data, wherein said document image transmission unit transmits information of the object converted into the vector data by said conversion unit.

9. An image processing method of generating metadata for searching for an object in document images formed from a plurality of pages and transmitting the metadata to an external apparatus, the method comprising steps of:

dividing each page in the document images into regions in accordance with attributes, the divided regions including a body region having a body attribute and a caption region having a caption attribute adjacent to an object;

performing character recognition for the caption region and the body region divided in the dividing step, thereby obtaining character information of the body region and character information of the caption region;

a first assignment step of assigning an identifier to the object adjacent to the caption region, the identifier being an identifier for identifying the caption region;

detecting the character information of the body region containing an expression synonymous with the character information of the caption region and extracting, as metadata of the object, character information including information other than the expression synonymous with the character information of the caption region from the detected character information of the body region;

a second assignment step of assigning the same identifier that is assigned in the first assignment step to the metadata extracted in the detecting step;

a document image transmission step of transmitting, in a predetermined page unit, information of the object to which the identifier has been assigned in the first assignment step; and a metadata transmission step of transmitting, in order to associate the metadata with the object, the metadata to which the same identifier has been assigned in the second assignment step after processes of the dividing step, the performing step, the first assignment step, the detecting step, the second assignment step and the document image transmission step are executed for all of the plurality of pages.

10. The method according to claim 9, wherein in the document image transmission step, information of the object having the identifier is transmitted for each page.

11. A non-transitory computer-readable storage medium storing computer executable code of a program which causes a computer to execute the information processing method of claim 9.

* * * * *